United States Patent [19]
Chuang

[11] Patent Number: 5,987,421
[45] Date of Patent: Nov. 16, 1999

[54] COMPUTERIZED SYSTEM AND METHOD FOR LOCATING INDIVIDUAL MEMBERS OF DISCRETE GROUPS AND FOR ELECTRONICALLY REGISTERING AND HOLDING THE GROUP'S POSITION IN WAITING LINES

[75] Inventor: Cliff L. Chuang, Boston, Mass.

[73] Assignee: Morfun Systems, Inc., Boston, Mass.

[21] Appl. No.: 09/018,868

[22] Filed: Feb. 5, 1998

[51] Int. Cl.⁶ .............................. H04Q 7/00; H04B 7/00; G06F 17/40

[52] U.S. Cl. .................... 705/7; 705/1; 705/32; 340/825.31; 340/825.44; 340/825.47; 455/456

[58] Field of Search ............. 705/1, 7, 32; 235/376; 340/949, 286.09, 286.06, 825.31, 825.44, 825.47; 455/31.2, 38.3, 456, 518, 519

[56] References Cited

U.S. PATENT DOCUMENTS

| | | | |
|---|---|---|---|
| 3,742,141 | 6/1973 | Duncan et al. | 379/102.01 |
| 4,899,370 | 2/1990 | Kameo et al. | 379/102.03 |
| 4,931,932 | 6/1990 | Dalnekoff et al. | 705/5 |
| 5,506,587 | 4/1996 | Lans | 342/357.09 |
| 5,526,357 | 6/1996 | Jandrell | 370/346 |
| 5,664,111 | 9/1997 | Nahan et al. | 705/27 |

*Primary Examiner*—Jim Trammell
*Assistant Examiner*—Demetra R. Smith
*Attorney, Agent, or Firm*—Lambert & Associates, PLLC; Scott B. Garrison; Gary E. Lambert

[57] ABSTRACT

The present invention is a state of the art technological system composed of computers and local area radio network technologies to allow visitors to an amusement park or similar facility to electronically register for positions within a line for those popular rides, attractions and restaurants thereby eliminating the physically tiring wait in the actual lines. The system also allows park visitors to search for the location, distance and direction within the park boundaries of all other members within the same group at any given time. The invention includes a computer system as a main control, a number of specialized communication modules at appropriate locations and a larger number of movable visitor ID devices operating in a custom designed method to provide the above mentioned services. The system is simple to use and can be fully automated thereby reducing the manpower necessary to otherwise run the park.

47 Claims, 15 Drawing Sheets

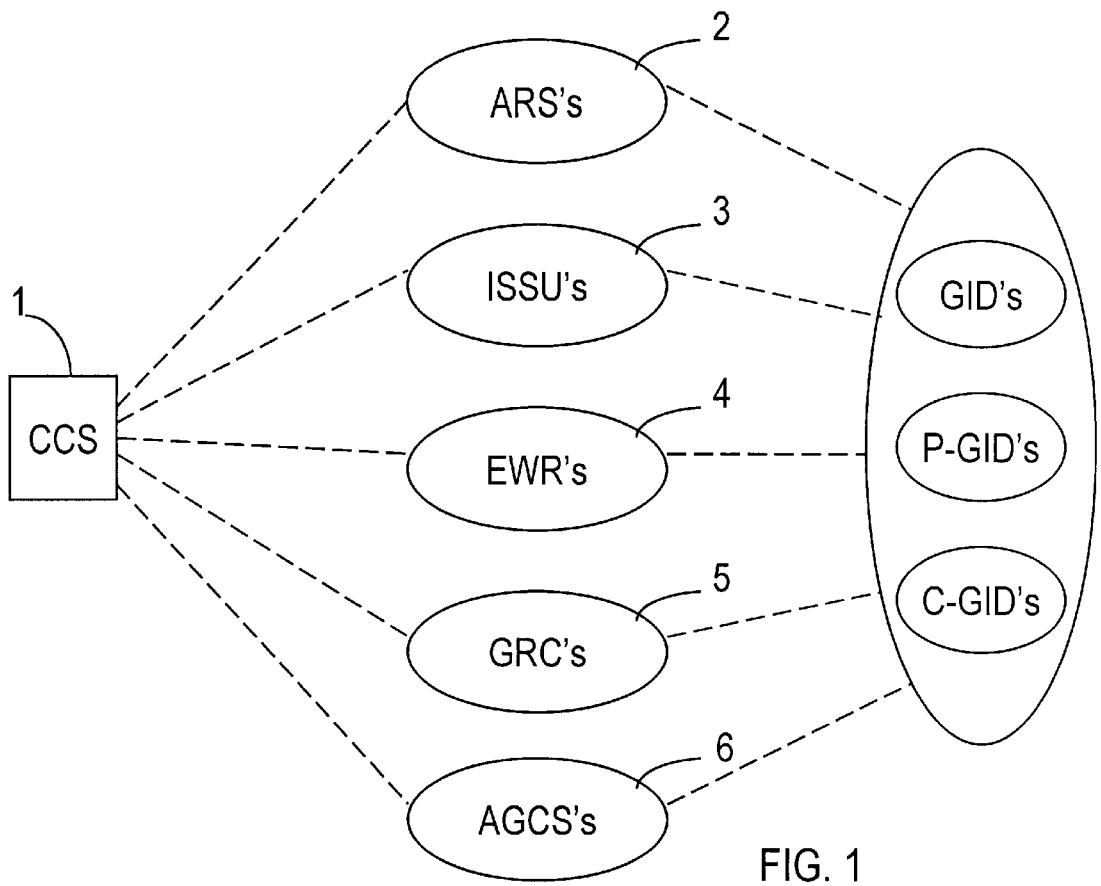
FIG. 1
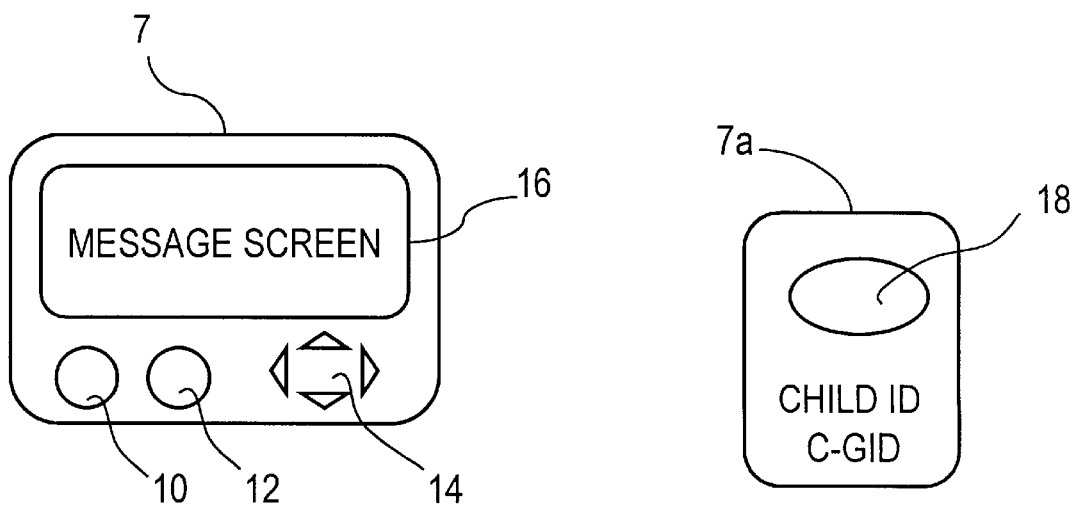
FIG. 2
FIG. 3

COMPUTERIZED SYSTEM AND METHOD FOR LOCATING INDIVIDUAL MEMBERS OF DISCRETE GROUPS AND FOR ELECTRONICALLY REGISTERING AND HOLDING THE GROUP'S POSITION IN WAITING LINES

BACKGROUND OF THE INVENTION

The present invention relates generally to computerized systems for electronically registering and holding a position in line and for tracking individuals whereabouts in real time. More specifically, the invention enables any group member of a predesignated group to search for the location, distance to, and direction of any other member in the same group; it also provides a means for electronically registering and holding a position in line without requiring the physical presence of the user. It is of particular use in a large amusement park or the like.

What is the most disliked aspect for a customer at a fast food restaurant? The answer is: "waiting in the line"! To the American public waiting in line whether it be for a restaurant, an administrative agency such as a Motor Vehicle Registry or an Unemployment Agency, or even in traffic is considered to be the most bothersome and useless waste of time to which one is subject. This most disliked of problems can at times be even worse in entertainment centers such as large amusement parks. At a typical large scale amusement park, such as Disney World or Busch Gardens, the incredibly long wait in a line at the more popular rides aggravates the park visitor even more. It is not unheard of to have an average wait from 40 minutes in the off-season to greater than 2 hours during peak season. This situation disappoints park guests since typically they have paid for expensive passes to visit the park and expect to enjoy park attractions, only to be subjected to aggravating lines. Often times a greater portion of the guest's time at the park is consumed by waiting in the line than is expended on accessing the park's attractions. For instance at Disney World in Orlando, Fla. the total waiting time for a visitor can easily run from 60 to 80 percent of the total park time.

A typical park guest at any amusement is likely to bring children along. For it is primarily the children that the park seeks to attract. One of the traits of most children is their inherent inability to remain inactive for long periods of time. Because park attractions typically require extensive waits prior to actually getting on the ride, children get fidgety from the inactivity and the parents get frustrated. To combat this, if at all possible, many parents permit their children to run around within their sight. However, this often results in the children running off or at least going out of direct sight of the parent. When this occurs, a parent becomes concerned, possibly even terrified. The stress associated with losing one's child can be intensified many times over since the parks are hundreds of times larger than other places one might lose a child, such as a drugstore. Furthermore, since the park is predominantly designed for children, there exist many more attractions which draw a child's attention away from his parents.

Although the concerns thus far discussed pertain to the park guests, it should be equally apparent that these same concerns exist for the park owners. Since it is often necessary to wait in line for each attraction, sufficient park real estate must be devoted to areas within which park guests can wait. Also, many potential guests who would otherwise enter the park are discouraged by the lines. By minimizing the bottlenecks caused by the lines, park revenues should increase.

SUMMARY OF THE INVENTION

What is needed is a simple, cost effective, user friendly, and convenient system which enables a parent to track the whereabouts of her children and her spouse. Additionally, the system must be able to eliminate a majority of the time currently wasted by waiting in a line for a particular attraction. The invention herein accomplishes this by providing a family or other group with a number of hand held or user fastenable electronic pager-like devices. Each group member is provided with such a device and all the devices are linked one to the other within the group or family. The device satisfies both problems. However, nothing prevents the device from being designed specifically to rectify only one or the other of the aforementioned problems.

The first function satisfied by the invention enables one member of a group to query his device as to the whereabouts of any other member of the same group who may be missing. The location, including the approximate distance and direction of the missing member is conveniently displayed to the querying member upon a view screen contained within the device. The second function performed by the invention, that of eliminating the physical waiting in line for certain attractions, is accomplished in either or both of two manners. The first is to direct the guest to simply approach some specific designated area within the park associated with the desired attraction. Once there, a reader mechanism electronically scans the guest's device and registers the guest in line for the next available position as if he actually entered the line. The other manner with which to enable the guest to register in a line is to provide a suitable mechanism on the device itself which will automatically register the guest without requiring her to proceed to some designated area. Either way, once the guest is registered she is then free to wander about the park until the device notifies her that she has only a finite period of time within which to proceed to the attraction or she will forfeit her position. All of the solutions thus far mentioned are easily accommodated by programming each device with a specific identification (ID) number. Any quantity of such devices can be linked together via the same technology.

The overall system configuration of the present invention comprises a computer system which interacts with a plurality of individual components comprising five types of sub-components. Each of the five sub-components, also referred to as sub-systems, are further linked to the tracking and registration devices carried by the park guests. Since the tracking and registration devices by their nature are portable, each has its own power supply and the ability to send and receive wireless transmissions over the boundaries of the park system.

The computer system or main hardware component comprises a computer with associated software, referred to as the Central Control System (CCS). The CCS is equipped with communications equipment able to access each of the five sub-systems. These sub-systems include; a number of Identification Signal Searching Units (ISSU) installed at appropriate locations within the park boundaries; a number of Electronic Waiting-in-Line Registers (EWR) installed at the entry points of popular rides or attractions within the park; a number of Automatic Rental Stations (ARS) installed at the park main gates as well as other points throughout the park to enable park guests to obtain the tracking and registration devices known as Guest ID (GID) devices; sufficient GID Return Collectors (GRC) located at the park exits to return the GID devices; and finally, a number of Automatic GID Checking Stations (AGCS) located appropriately throughout the park to test and reinitialize the GID devices as they are returned to the AGCSs. The CCS, as the master module, communicates with each of the five sub-systems or sub-components as appropriate. Each of the sub-systems is designed to perform some specific task with respect to the GID devices and each of the sub-systems relay instructions, information, or status back to the CCS.

For instance, each ISSU acts as a communication relay between the CCS and any particular GID device via wireless communication. In some circumstances, the ISSUs can communicate between two particular GID devices without contact with the CCS. The primary purpose of each ISSU is to receive a signal from a number of sources, relay necessary information to the appropriate destination, process requests where required, and take any additional action designed by its software to be appropriate. Each ISSU is capable of receiving a signal from any GID device or the CCS. It emits a signal targeted to a specific GID device. Upon initialization, all ISSUs remain in a standby status waiting for a signal from any GID device or from the CCS.

Where the ISSU sub-system performs the searching and tracking function of the invention, it is the EWR which enables registration of a particular GID device ID for an attraction. The EWR automatically enters, into a self-contained database, each request for registration for its associated attraction. One preferable method by which this is done is for a park guest possessing a GID device to be directed by appropriate directional indicia through a registration gate correlating to the attraction. The EWR receives the specific ID of the guest's GID device and adds that ID to the next available time slot for the attraction, the database contained within the EWR is suitably updated and the information is also forwarded to the CCS for entry into its master database. The guest is notified of his or her place in line by an appropriate display on his GID device. The display will indicate the wait time associated with that particular attraction. As the wait time runs down to some predesignated time periods, for instance; the final 15 minutes, 10 minutes, and 5 minutes, the GID device will display reminder messages. At an appropriate point in time, the guest will be allowed to enter a specific site which will read his GID device, log him in as present, and allow him to wait a short period of time for entry into the attraction. In the event that the guest misses the registered ride, suitable programming subroutines can be provided if desired, which will automatically renew the waiting time associated with the attraction.

The third sub-system enables a guest to purchase, or as is preferred, rent an appropriate quantity of GID devices. This system, though not actually needed, should be as simple as possible so as to enable guests to easily interact with the sub-system and receive their GID devices quickly and conveniently, thereby enabling other guests to access the sub-system. If the situation warrants, GID devices could be distributed to park guests upon their entry to the park by a park attendant. However, to further automate the system, it would be desirable to provide guests with a mechanism capable of debiting a credit card and in return distributing a sufficient quantity of GID devices for use to the group. Accordingly, it is envisioned that the ARS be provided a keyboard or touch sensitive display screen to interact with park visitors who wish to utilize the system services. The device should have a credit card reader to automatically take credit account information such as the visitor's name, address, and account number, etc. and forward this information to the CCS. The CCS stores the information within its master database and processes the rental charge on the credit account, debit card, or other suitable account. Of course, the ARS could also have a suitable receptacle similar to an Automatic Teller Machine capable of receiving currency if this were so desired. Upon successful completion of the transaction, the CCS authorizes the ARS to distribute the appropriate number of GID devices as requested by the guest. In the event that more than one GID device is rented, the GID devices are linked to each other so that they now function as a group. The group linking relation information is stored in the CCS database for later reference.

The remaining two sub-systems, also not necessary but desired for creating a fully automated system, are the GRC and the AGCS. These sub-systems together provide for the collection, functional testing, and reinitialization of all returned GID devices. The former provides a means to collect the GID devices when guests leave the park. In the event a GID device is not placed in an appropriate receptacle, the GRC emits a general signal capable of activating an audible alarm on the non-returned GID device. The signal is short range in scope and therefore is meant only to activate the specific GID device which has gone beyond some preset boundary. If a park visitor ignores the warning and removes the GID device from the park, the guest's account as previously recorded in the CCS by his input at the ARS is appropriately debited.

The latter, or the AGCS performs functional testing of each returned GID device and prepares them for redistribution accordingly. If the GID device requires a power supply replacement a new battery (or suitable power supply), is automatically installed into the GID device by the AGCS. The AGCS also makes the determination, via functional testing, as to whether a GID device is functional in which case it is returned to service or nonfunctional in which case it is disposed of. Assuming that the AGCS determines that all GID devices allocated to a specific credit card have been returned, the AGCS sends a signal to the CCS enabling the processing of a deposit reimbursement if appropriate.

As previously noted, the GID device is a small electronic device similar to a pager which is designed to be carried by or clipped onto the clothing of park guests. Each is encoded with a unique identification (ID). To the guests' perspective, it is the GID device which forms the interface between them and the remainder of the system. Through its particular ID code each GID device is able to register with any EWR or be tracked by, receive information from, or send information to, any ISSU. Each GID device is equipped with user manipulable inputs, such as push buttons or the like providing the guest with a number of specific preprogrammed options, such as; locate a GID device from the same group, register for a particular attraction, trade registrations with any other GID device within the park, and willing to trade. The specific programming instructions can be varied according to the desire of the park owner. Further, the GID devices have a user viewable screen to display messages upon, which notify or otherwise instruct the guest.

The invention provides both the sophisticated and unsophisticated customer with a quick and easy way to register for an attraction by accommodating two methods of registration. The first method works automatically when the park guest walks through a designated area associated with each EWR. The GID device is electronically accessed via wireless communication, and the park guest is provided with a readout upon the GID device view screen which notifies the guest when his scheduled appointment is to take place. The second method, allows a more sophisticated user the ability to simply access an appropriate programming sequence on the GID device which sends a wireless signal to the nearest ISSU which is then relayed via the CCS to the appropriate EWR thus registering that GID device for the particular attraction. Either way, the customer is not inconvenienced with an excessively long line nor a difficult registration process. The system takes care of the entire operation and maintains an appropriate record of which customer is scheduled for each attraction over the course of the entire day.

The invention provides a method which maximizes the use of the park by, in essence, networking the entire guest population within the park together. Though the system is not meant to provide a means for enabling every guest to track any other guest within the park, all guests are networked to the CCS. With this system the entire guest population should be able to interact more efficiently since no one is forced to stand in line to maintain their position. This should have the effect of expanding the ability of the lesser rides or attractions to attract guests. It should also increase business throughout the shops, restaurants, and kiosks of the park system.

An added advantage is that it provides the park with the inherent ability to statistically analyze the popularity of rides, programs, restaurants, etc. by enabling the CCS to keep an accurate database of all activities within the park. With this information, the park designers are given the ability to develop attractions which are more appropriate to the guest population. Correspondingly, attractions which do not generate sufficient activity to justify their operating expenses can be replaced with better attractions, thus increasing the enjoyment of the guests as well as the likelihood that the guest will frequent the park more often.

The invention is unique because it is the only method by which each park guest can access at his or her will a system capable of locating any other park guest within the group. Furthermore, each guest can instantly determine the status of each attraction within the park, register for their desired attraction, or even exchange positions with other members of the park for specific attractions without being forced to unnecessarily move about the park or interact with people whom they exchange positions in line with. All of this can be done on a dynamic, continuously updated, real time basis.

It is also the only system that accomplishes these tasks without constant human intervention since it is designed to stand completely apart from the normal activities associated with park employees. As stated, the GID devices can be automatically distributed to guests by debiting a suitable credit card or the like via fully automated distribution machines or ARSs. Each GID device is wholly operated by its user and interacts with the appropriate sub-system. Collection boxes are provided throughout the park system for returns. Also testing and reinitialization can be accomplished automatically. The only time manpower is absolutely necessary is for system maintenance and repair.

Although amusement parks are considered the most appropriate use of the invention, the system can be readily adapted to many other applications. The important characteristics to keep in mind are its ability to easily provide any member of a particular group with an accurate location with respect to any other group member's position. It also provides for the electronic registration of a person who would otherwise be forced to wait in a long line. Each of these features can be accomplished in a manner which appears relatively seamless to the user and with a device that is simple to operate and understand.

As can be clearly seen, the present invention provides a solution to a serious flaw in amusement parks which until the present time has not been addressed. The present solution yields substantial improvements over any existing systems.

Accordingly, it is an object of the present invention to provide a system and method to substantially eliminate the most disliked problem facing amusement theme park visitors, i.e., waiting in long lines.

It is another object of the present invention to enable park visitors to best use their park visiting time to enjoy the exciting attractions, rides, relaxation facilities, and restaurants.

It is yet another object of the present invention to make it possible for park visitors to simultaneously electronically wait in lines for more than one popular attraction so long as they are not scheduled to be in more than one place at any one time.

It is another object of the present invention to provide park visitors with the capability to enjoy more rides within their limited park attendance time.

It is also another object to provide the ability and flexibility to park visitors to exchange their registration with respect to an attraction instantly and electronically with any other willing park visitors.

It is a further object of the present invention to increase business within the park in addition to customer satisfaction by freeing the park visitors from the long physical waiting lines thus allowing each visitor the opportunity to spend more time and money on other park attractions, gift shops, food courts, and restaurants.

It is another object to increase the contributions of the small rides and less crowded attractions to total visitor satisfaction by eliminating the large crowds of visitors heretofore physically entrapped by the long waiting lines at the popular rides, since guests will have more time to visit all other park attractions.

It is yet a further object to improve utilization of the park's real property by eliminating the need of setting aside large areas at the entry of the popular rides for the long waiting lines.

Another object is to provide the park with the option of receiving an additional source of revenue by allowing the association of a nominal fee with specific requests submitted to the system by the GID devices.

It is yet another object of the present invention to provide park visitors with the ability of finding out the exact location, distance, and direction of another member of the same visitor group when a visitor group member has the need of this service.

It is still another object to substantially reduce the stress of parents of worrying about missing children.

It is a further object of the present invention to help parental visitors to enjoy the amusement parks since with the group member self search function they can easily and quickly locate their children if the child is properly equipped with an appropriate GID device.

It is still another object to provide the park management with accurate statistical data on monthly, weekly, daily, and hourly basis. Other features and advantages of the invention are set forth in the following description and drawings.

BRIEF DESCRIPTION OF THE DRAWINGS

The novel features considered characteristic of the invention are set forth in the appended claims. The invention itself, however, both as to its construction and its method of operation, together with additional objects and advantages thereof, will best be understood from the following description of the specific embodiments when read and understood in connection with the accompanying drawing.

FIG. 1 is a functional block diagram of the system according to the invention;

FIG. 2 is a perspective view of a GID device in accordance with the present invention for use with the FIG. 1 system;

FIG. 3 is a perspective view similar to that of FIG. 2 depicting a simpler embodiment of a GID device;

DETAILED DESCRIPTION OF THE PREFERRED EMBODIMENT

Figure 4:
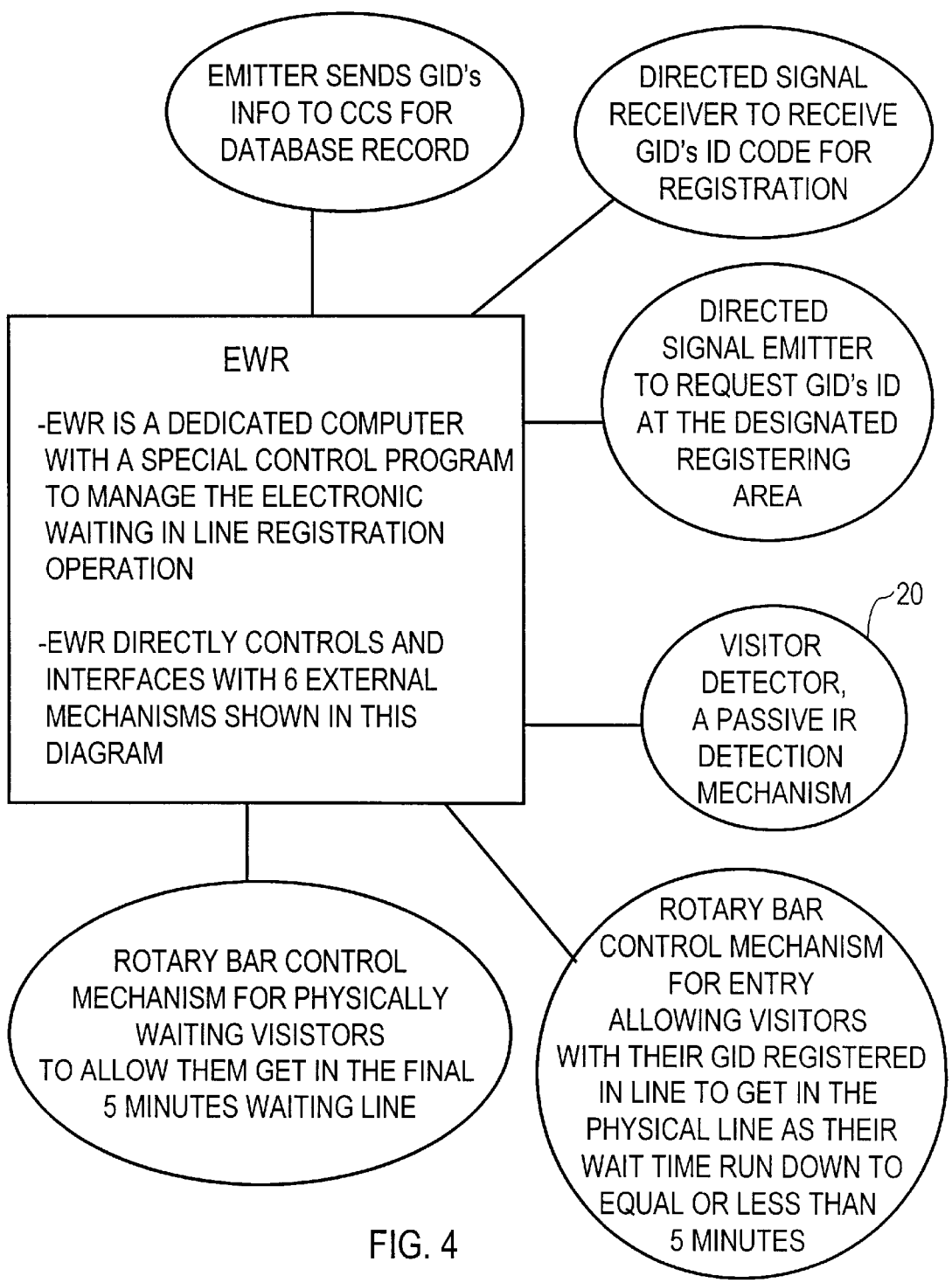
FIG. 4 is a block diagram of an Electronic Waiting-in-Line Register for use in the FIG. 1 system.
Figure 5:
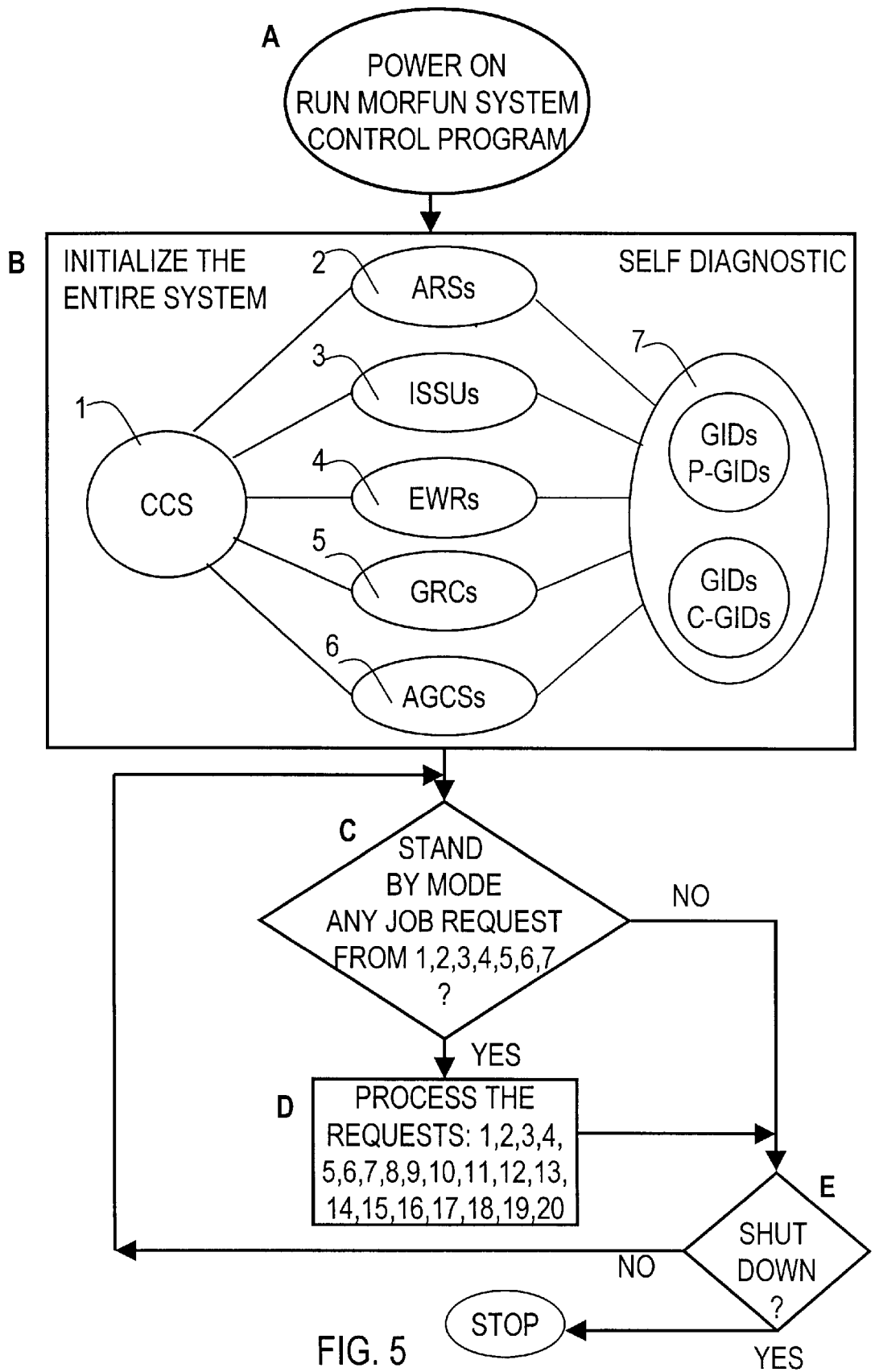
FIGS. 5 through 13 depict flow chart diagrams of the operation and inter-relation of the various sub-systems of the FIG. 1 system.
Figure 6:
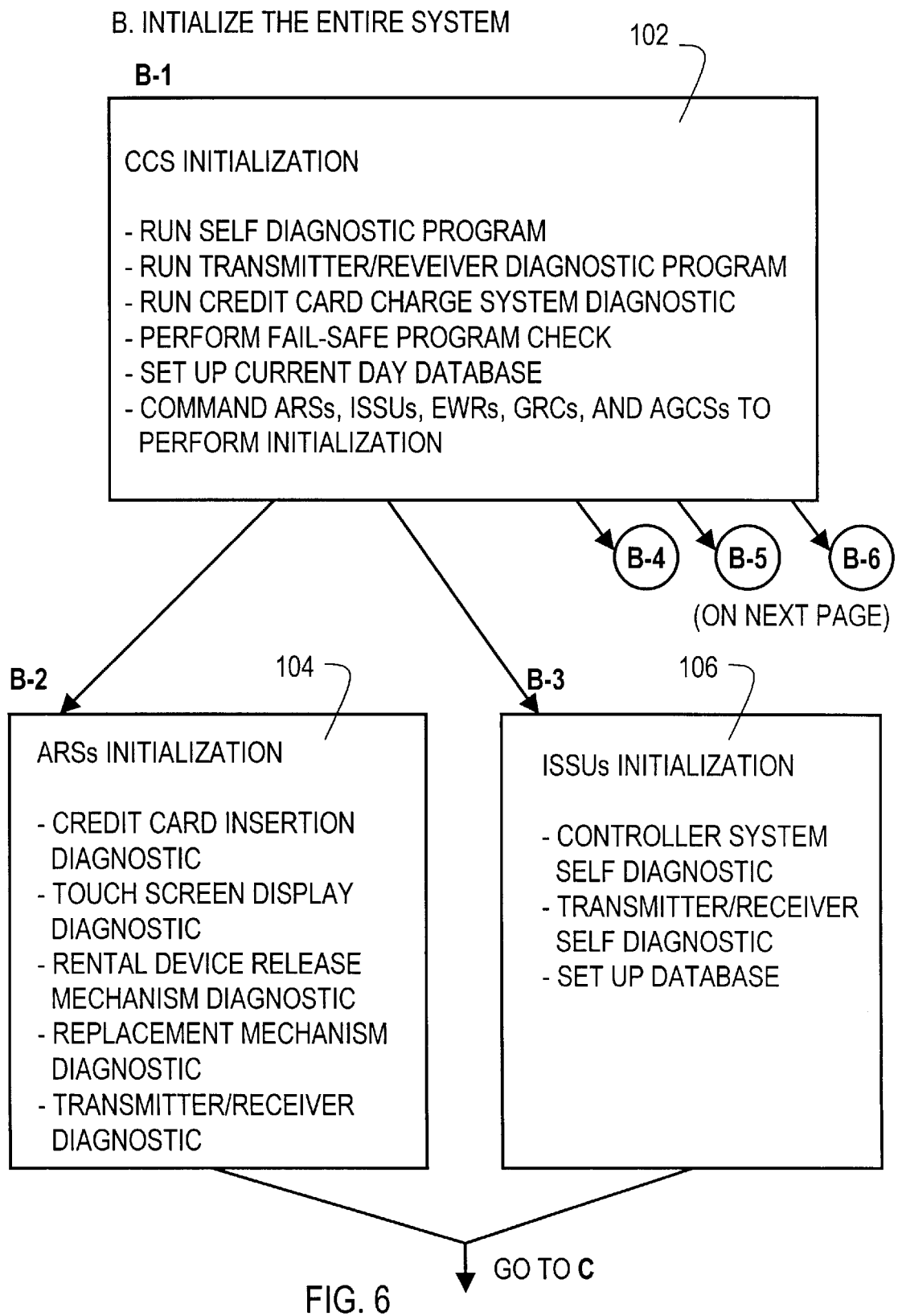
Figure 6:
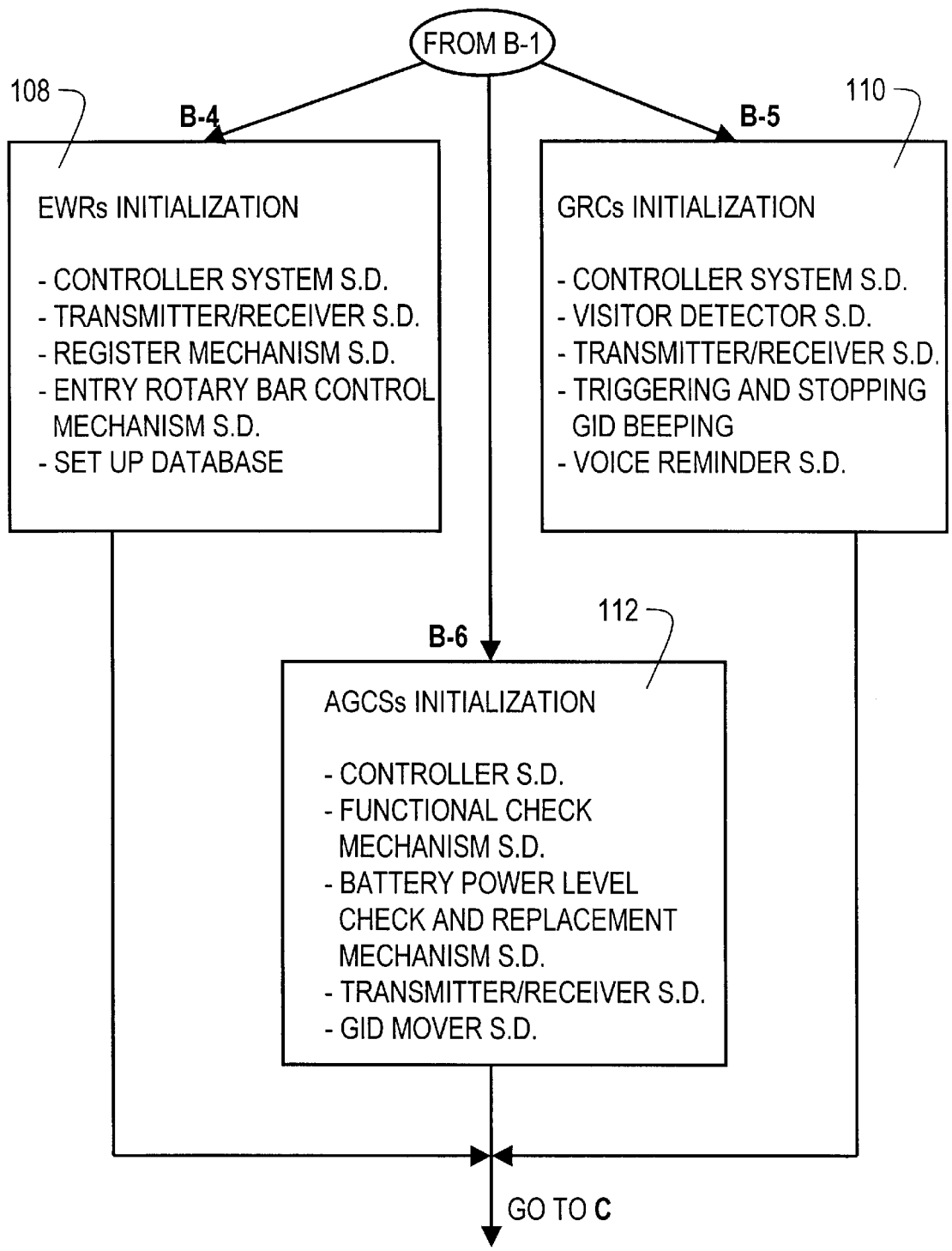

With reference to FIG. 1, the overall system configuration of the present invention preferably comprises seven different types of interrelated components. Each type of component utilizes specific software routines designed to function in conjunction with the particular component. There is a main or Central Control System (CCS) 1 which interacts with five sub-components: a number of Automatic Rental Stations (ARS) 2; a number of Identification Signal Searching Units (ISSU) 3; a number of Electronic Waiting-in-line Registers (EWR) 4; a number of GID Return Collectors (GRC) 5; and a number of Automatic GID Checking Stations (AGCS). Each of these sub-systems 2 through 6 are individually capable of communicating with a number of Guest ID (GID) devices 7 distributed to park guests.

The preferred embodiment of the invention comprises a host computer system capable of performing each of the tasks summarized above and as discussed throughout the remainder of this disclosure. This host computer system should comprise at least an 80586 processor, although other systems capable of performing the requirements discussed are also appropriate. Furthermore to increase the fail-safety as well as to alleviate information processing time in the event the system is burdened, it would be preferable for the host computer system to comprise dual-processors and even be backed up by a second or redundant host computer system. Sufficient Random Access Memory (RAM) should be provided to enable the host computer to perform all necessary functions.

In order for the host computer system to communicate with the five sub-systems, communications equipment is necessary. Communications can be accomplished via wire, wireless transmission, modem, network, or the like. The computer industry is well equipped to provide the most appropriate means based upon the specific conditions which exist at the park. The host computer system must also be provided with an appropriate means for data storage since extensive statistical data is made available with the system. Again the computer industry is well equipped to provide the most appropriate means based upon the specific conditions which exist at the park, whether hard drive, CD, tape or other form of data storage. Regardless of which form of storage is deemed appropriate it is desirable that it have both read and write capability so that the information can be utilized when needed. In its entirety, the host computer system, whether stand-alone or duplicated; including the data storage, memory, and communications equipment is referred to as the CCS 1. Additional components which are envisioned a part of the CCS 1 would be at least one removable drive media, such as a floppy drive, a monitor, some form of local data input such as a keyboard, appropriate software, and a credit/debit charge and refund mechanism.

From the perspective of a visitor or park guest, the system is designed to accomplish two primary functions. The first is to eliminate the majority of time guests are typically required to physically wait in line for the park's more popular attractions by allowing the guest to register for a virtual position in the line. The second function is to enable a park guest to track and locate other members of the park guest's specific group. To accomplish this, it is necessary that each guest who desires these capabilities be provided a GID device 7. One possible arrangement of such a GID device 7 is depicted in FIG. 2. The GID device 7 should be a wireless transceiver similar at least in size to a telephonic pager. At the simplest level, each GID device should be provided with a user interface providing the guest with a number of selectable options or actions from which to choose. One suggested user interface would comprise a stop button 10, a send button 12, and a plurality of scroll buttons 14, preferably an up, down, left, and right scroll button. Generally, each GID device 7 should also be provided with a view screen 16 for the display of messages. A simple speaker (not depicted) is also needed to provide auditory notification to the user of a specific occurrence. Additionally, each GID device requires a power source, such as a battery (not depicted) to make it operational.

Other features of the preferred embodiment are to enable the representation of alphanumeric text on the view screen 16. Such text can be accessed by scrolling with scroll buttons 14 and selecting the appropriate indicia by use of another scroll button or the stop button 10. Of course, possibilities abound regarding how to scroll and select specific text on a device of this type. Another useful addition is a panic key which can send a signal to a park attendant that the park guest is in trouble. Along with or in place of the speaker, a vibration mechanism can be added to alert the user to some action. The GID device can also be equipped with a small integrated circuit capable of performing a self-diagnostic subroutine.

Each GID device is programmed with a unique identification code. The identification code can be permanently associated with the device via Read Only Memory or can be reprogrammed coincident with the distribution process each time the device is distributed to a guest. The preferred method would be to logically link the appropriate GID devices within the CCS 1. During the distribution process, based upon the information input by the guest, each GID device can be linked to any number of other GID devices. However, in order for the GID devices to be linked all members must be in the same group. This is easily ensured by requiring all of the GID devices distributed to any one group to be debited against the same credit card or transaction. Of course limiting the number of GID devices in a group is not essential to the invention itself, the process only pertains to the most desirable method of implementing the system.

Small children can be appropriately tracked by their parents via the use of the GID devices. However, it is not necessary to provide children with all of the features found on the GID devices. To accommodate their different needs a simplified version can be provided for children. This simplified version or C-GID device 7a is depicted on FIG. 3 would not require any of the features 10 through 16 contained by the GID devices 7. However, one practical feature that the C-GID device could utilize as mentioned supra is a panic button 18. Each child carrying a C-GID would be instructed to press the panic button if lost, abducted, etc. A general alarm to the park system could be made to alert the park personnel to locate the child, if the panic button 18 is depressed.

By scrolling through the various selections displayed on the GID device's view screen 16 via the scroll buttons 14, a guest can select a number of options. When the proper selection is highlighted, the send button 12 is depressed. Though not meant to be limiting in specific embodiment or quantity of options, the following categories are preferably envisioned to be provided as selections and sub-selections: REGISTRATION, SEARCH, and MESSAGE. Sub-categories under REGISTRATION would include a list of the park's attractions, restaurants, and anything else which might require a line. SEARCH would have sub-categories for each individual GID device 7 or 7a which is a part of the group. The MESSAGE category provides a list of messages which can be scrolled through. The messages would include such things as the location of a particular GID device which was searched, confirmation and scheduling for the various attractions and restaurants. Additionally, by enabling the input of alphanumeric text, additional messages can be transmitted.

It should be obvious that the specific messages, categories, and sub-categories can be programmed based upon the requirements of the park. No limitation is intended regarding their character or quantity. For instance, in the preferred embodiment, it is envisioned that a procedure for trading registrations amongst guests be provided. Implementation of this function would enable one park guest to trade his or her ride with any other park guest regardless of whether they were members of the same group. Through the appropriate selection on the GID device, a message is sent to the CCS which then allows a general message to be sent to all GID devices within the park system. If another guest is interested in making an exchange, the proper message is relayed back to the CCS. The CCS would simply send messages to each affected sub-system regarding the exchange. In essence, the position in line would remain the same, the GID device identification number associated with that position would simply be substituted for the new GID device identification number.

As the time approaches for the guest to proceed to the attraction for which she is registered, the GID device 7 would display an appropriate message. To ensure that the guest is alerted to any messages, the speaker can be activated, producing a sequence of beeps or other appropriate sounds. To silence the audible signal, the stop button 10 is depressed. At some predesignated time, for example five minutes before a ride is about to begin, the guest would be required to enter a line at the attraction for which he is registered. In the event that he was unable to reach this location in time, the system could be programmed to allow automatic re-registration at the next available time if desired by the guest.

Some means must be provided for distributing and assigning the GID devices to park guests who wish to utilize this service. Although the GID devices could be handed out to guests by park attendants upon entry of the park, an automated system is preferable. To accomplish this task, a plurality of ARS 2 sub-system sites are located throughout the park system at appropriate locations. At least one should be located at each major entrance to the park, but it would be preferable to provide a quantity of such ARS sites to accommodate all park guests quickly without extensive delay. Each ARS 2 would be provided with a suitable fee collecting device, preferably a credit card or debit card reader. Providing a speaker of some sort to instruct the guest as to the operation of the device is a desirable but non-essential function. A guest would insert or slide a suitable card through the card reader contained upon the ARS at which time a processor would read the information upon the card and relay the information to the CCS.

Assuming that credit authorization is granted, the CCS would enable the ARS to accept further guest input. Via a suitable input device such as a keyboard or touch sensitive display screen, the guest will be asked or otherwise provided with the option to select the number of GID devices he wants as well as the number of C-GID devices. The credit card will be automatically debited the fee plus a reimbursable deposit for each GID device to ensure that they are later returned. The ARS will relay this information to the CCS along with the appropriate GID device identification numbers for the quantity of GID devices 7 and 7a which are to be released to the guest.

At this point, the ARS would provide to the guest a sufficient quantity of linked GID devices in accordance with the selection made. In the event, that a guest believed that her GID device were malfunctioning, suitable disposal means can be provided at each ARS to enable exchange of a malfunctioning GID device with a replacement. Re-entry of the credit card number or having the credit card read by the card reader, would enable the CCS to update its database with the identification code of the new substituted GID device 7 or 7a so that it is fully functional within the guest's group.

Although the GID devices could be made non-returnable, to ensure that an appropriate quantity of the devices remain on hand at any given time as well as to reduce costs associated with the device, it is preferable that some means for returning the GID devices for reuse be implemented. To facilitate this, each exit should be provided with a GID return collector or GRC 5 where outgoing guests would "drop" or otherwise relinquish their GID devices. Should a guest accidentally or otherwise neglect to return the GID device, an audible alarm can be programmed to sound from that guest's GID causing sufficient embarrassment to dissuade all but the most determined to return their GID appropriately. Detection of GID devices can be accomplished by incorporating into each GRC the ability of infrared detection of visitors in addition to or in place of wireless RF signals which trigger a response from the GID devices located within some finite area.

To ensure that truly innocent guests are not unduly embarrassed, more than one audible signal can be incorporated into each GID device. The first signal would comprise an innocuous reminder to the guest, the second would be sufficiently audible to draw the attention of third parties, such attention being designed to sufficiently embarrass the guest until the GID device is returned. Additionally, the GRC 5 itself could be provided with an audible alarm so that a non-returned GID device triggers it to alarm as well. To increase the effectiveness of the alarm, the stop button 10 should not be able to silence the GRC alarm. Alternatively, to silence the GRC alarm, the GID device is required to be deposited into a special receptacle within the GRC which deactivates the alarm via a wireless signal. Should the park guest somehow mute or disable the audible alarm, or should the guest somehow otherwise remove the GID device from the park; the deposit which was collected during the GID device rental process would simply not be refunded and would be appropriated. Each GRC is envisioned to include a computer, with sufficient RAM, data storage, local data input, monitor and the ability to send and receive signals from the GID devices and the CCS 1.

Once the GID devices are collected, they are returned to the system for reuse by another park guest. To ensure that damaged units are removed from the system, a number of Automatic GID Checking Stations or AGCS 6 are employed which subject the GID devices to appropriate diagnostic subroutines and checks to determine whether the device is in reusable condition. A functional test and battery test is performed by the AGCS. The functional test simply cycles the GID device through suitable algorithms which determine whether its video, audio and user selectable buttons work properly. A battery test is also conducted to determine if battery strength is sufficient to allow the device to be reused with the present batteries. In the event the battery fails, a new battery is installed within the device and the device is retested for functionality. If the device fails this second test, the device is disposed of in an appropriate manner. However, if the device passes, it is returned for redistribution. The CCS is provided with the data collected by the AGCS pertaining to which GID devices are removed from the system as defective as well as which GID devices are returned so that deposits associated with the collected GID devices are reimbursed if appropriate.

Each AGCS should comprise a computer system with RAM, data storage, means of communicating with the CCS 1, a robotic or mechanical mechanism which performs the functional testing, power supply testing and replacing, rejection of GID devices and returning of satisfactory devices to the overall system.

Inasmuch as the GID device 7 and 7a interact as both input from the guest and output for the guest; each GID device itself would be useless without the addition of two critical sub-systems. Each of these sub-systems can stand separate from the other sub-systems discussed supra. The first provides the means with which the guest's GID device is located. A plurality of these components, known as ISSUs 3 or Identification Signal Searching Units are placed throughout the park environment. The greater the quantity of ISSUs spread throughout the park property, the more accurately a specific GID device can be located. The ISSUs 3 both broadcast to and receive signals from the GID devices. The second sub-system is known as the Electronic Waiting-in-Line Register or EWR 4. The EWR 4 provides the means for each GID device 7 or 7a to register for the next available position in line at an appropriate attraction. By transmitting an appropriate short range signal, all GID devices within some predesigned range from the EWR will be registered with that attraction. The guest is then free to wander about the park for a time.

The ISSU 3 operates as both a transmitter and receiver with respect to wireless signals sent to or received from any GID device. Each ISSU maintains its status in a standby mode waiting for instructions from a GID device or the CCS. Should a guest wish to locate another guest from his group, he simply selects the proper designation on his GID device. A wireless signal is transmitted from the GID device and is received by at least the nearest ISSU. The ISSU transmits the search signal in an attempt to locate the targeted GID device. If the GID device is found, its location and direction is relayed back to the ISSU which then forwards the information to the searching GID Device. In the event that the GID Device is not found, the search signal is relayed to the CCS via the ISSU. The CCS forwards the search signal to all ISSUs thus effectively blanketing the park. Once the targeted GID Device is located, its location and direction is relayed back to the ISSU which sent the original search signal via the CCS.

Basically the ISSU attempts a local search prior to signaling the CCS to send a full range search of the entire park. To accommodate this, each ISSU must have at least a central processing unit, associated memory, and data storage, in addition to the ability to receive and transmit various signals. In the preferred embodiment, the position of the targeted GID device will be with respect to the position of the searching GID device. For instance, a typical message might state the following:

Your Child—1 is at 'Attraction X', Map Code 18
Approximate Distance From You—90 Yards
Direction From You—Northwest To approximate distances in this manner, the location of any one GID device with respect to any other can be triangulated by simply using a plurality of ISSUs. Referral to a map code can be used to simplify the process for the guests. Map code designations can be created by sectioning off the entire park property into grid patterns or other suitable sections, easily identified on a map. Such maps can be placed throughout the park for display.

The EWR 4 as depicted in FIG. 4 performs five distinct operations and is provided with the necessary components to accommodate those functions. The first function that it performs is to remain in standby mode so that it can communicate on an as-needed basis with the CCS. It also communicates with GID devices directly and via signals to the nearest ISSU or to any number of ISSUs through the CCS. Each of these functions can be done via wireless transmission or alternatively network, hardwire, or other means of communication can be utilized. Each EWR 4 is associated with some particular attraction. As such each must have a means to enable guests to register for the attraction should they not wish to do so directly via the appropriate programming codes available on their GID devices. To enable a GID device to be registered, the guest must be directed to stand in, proceed through, or otherwise pass by a GID device detector 20.

In the preferred embodiment, the GID device detector 20 is embodied within at least one post having a transmitter which sends a universal signal across a space to a similar post. Each guest is required to proceed between the two posts. The signal sent by the GID device detector 20 causes the GID device 7 or 7a which is between the two posts to transmit its unique identification which is picked up by a receiver mechanism within the EWR 4. The EWR registers this unique ID into an electronic database which it maintains within a local memory module. The GID device is now registered for the next available time period for the attraction associated with the particular EWR. The information is sent to the CCS for storage and the time that the GID device is scheduled for the attraction is displayed upon the guest's GID device view screen 16. Each EWR constantly monitors its database with respect to schedule maintenance. As the time nears for which the guest is scheduled, the EWR sends out a signal via at least the ISSUs; targeted to the appropriate GID device reminding the user of the time increment remaining. For instance, it is envisioned that the final 15, 10 and 5 minutes of wait period prior to commencement of the attraction will be relayed to and displayed upon the guest's GID device.

At some time, prior to the time the guest is registered for, preferably five minutes before the attraction registration time, the guest is instructed by the view screen 16 of the GID device to immediately proceed to the attraction. Once there, the guest is required to enter another area containing an attraction entryway. This attraction entryway is envisioned to be a rotary bar through which the guest proceeds. Only those guests having a limited time such as five minutes or less remaining until their registered times are allowed access through the rotary bar. Again, this portion of the EWR can simply transmit a signal which causes all GID devices within a finite area to transmit their identifications. Only those GID devices which meet certain criteria, i.e., having five minutes or less, will be able to "unlock" the rotary bar and proceed to the attraction.

If a guest did not proceed to the EWR within the appropriate time, depending upon park management's preference, the GID device could re-register for the next available time automatically through an appropriate algorithm.

Even though specific hardware, software, and functional elements have been described herein, it should be noted that many possible alternatives exist. The embodiments described herein are considered illustrative for the purpose of describing the intent of the invention. Those possessing sufficient skill in the art may alter these embodiments accordingly without departing from the spirit of the invention and such alterations are considered to form a part of the present invention. It will be noted that the system is highly dependent upon computer systems. It is envisioned that numerous computers including local data input, monitors, sufficient RAM, and data storage be provided to operate the system in a smooth an seamless fashion. For instance, with the exception of the GID devices, all of the other sub-systems could readily be networked via LAN or WAN, fiber-optic, copper, or any other means of data transmission whether analog or digital. Of course, due to the requirements of the system and the intent with which it is to be used, such a system should be high speed and preferably digital.

To further define the invention, it is appropriate to describe and define how each of the systems interact on an operational level. FIGS. 5 through 13 depict the interaction of each of the components on an operational level. As such, operation of the system begins by powering on 100 or otherwise activating the CCS 1. Suitable algorithms instruct the CCS to perform an initialization process 102 which includes testing all CCS hardware and software to ensure functionality. The CCS 1 instructs each of the sub-systems 2 through 6 to initialize, 104 through 112 as seen on FIG. 6. Each sub-system component is catalogued within the CCS 1 as to its particular identification, location, and distance from any other specific component. This information is amassed during the initialization period 102 through 112, stored within the database of CCS 1 and updated on an as-changed basis. Various methods exist within the art to enable a component to determine its exact position, relative position, and bearing with respect to any other component. One such method is through the use of triangulating an unknown position with respect to at least two known positions. Since this is a relatively straightforward process, no further information is felt to be necessary on this point. Upon completion of the initialization process 102 through 112, the CCS 1 enters a standby mode 114 awaiting instructions from a technician or from one of the sub-systems.

Figure 7:
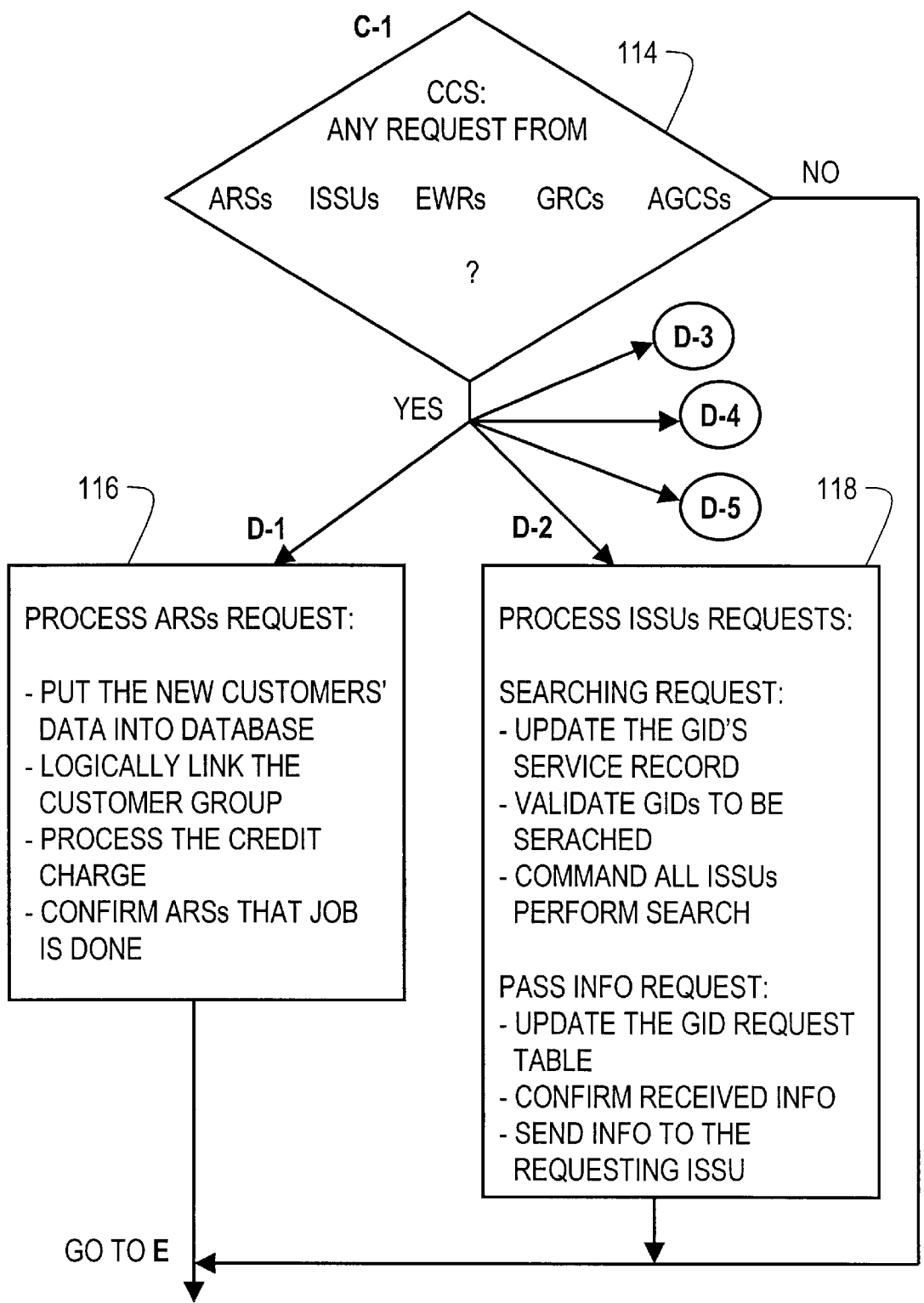
Figure 7:
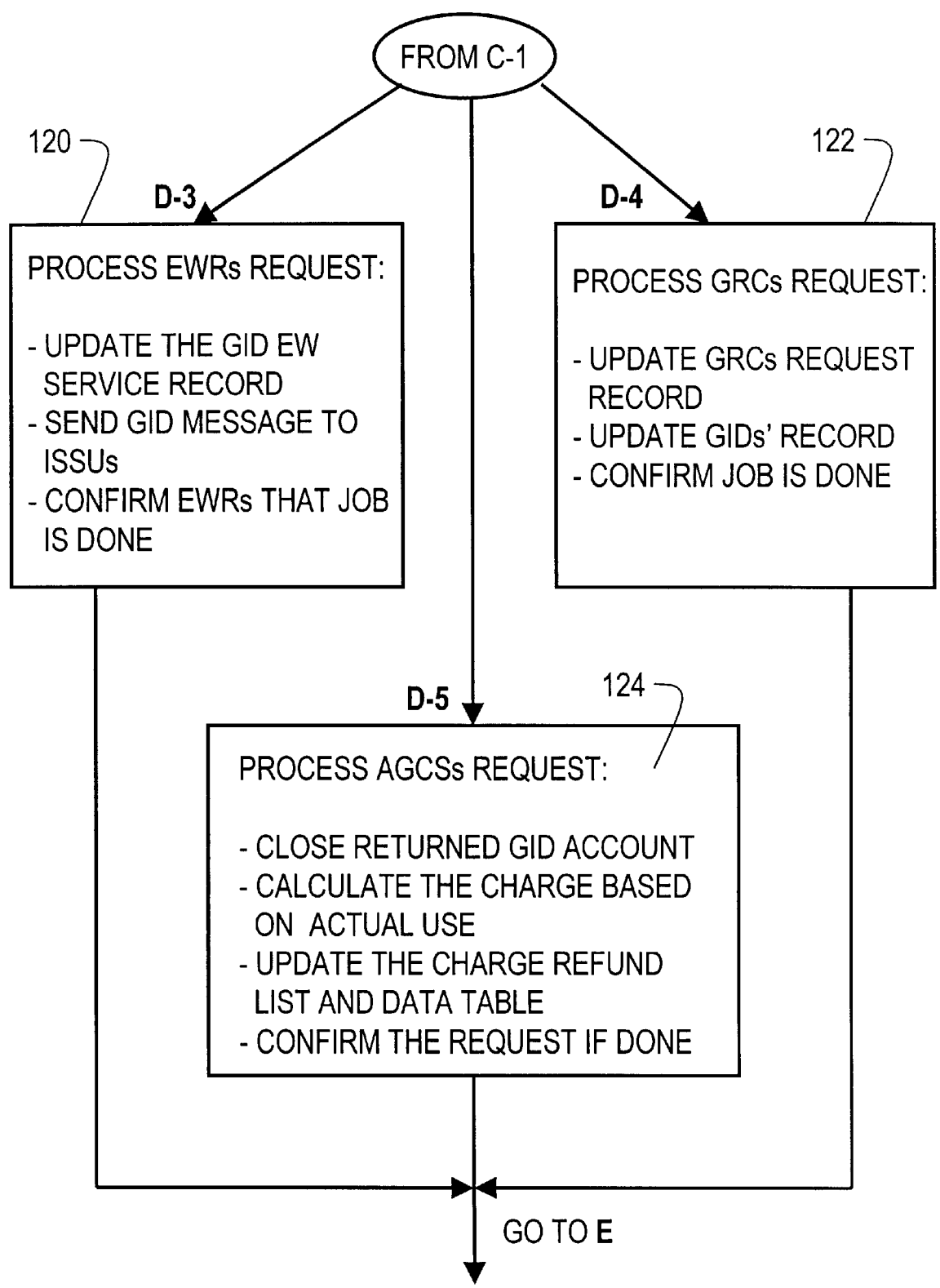
Figure 8:
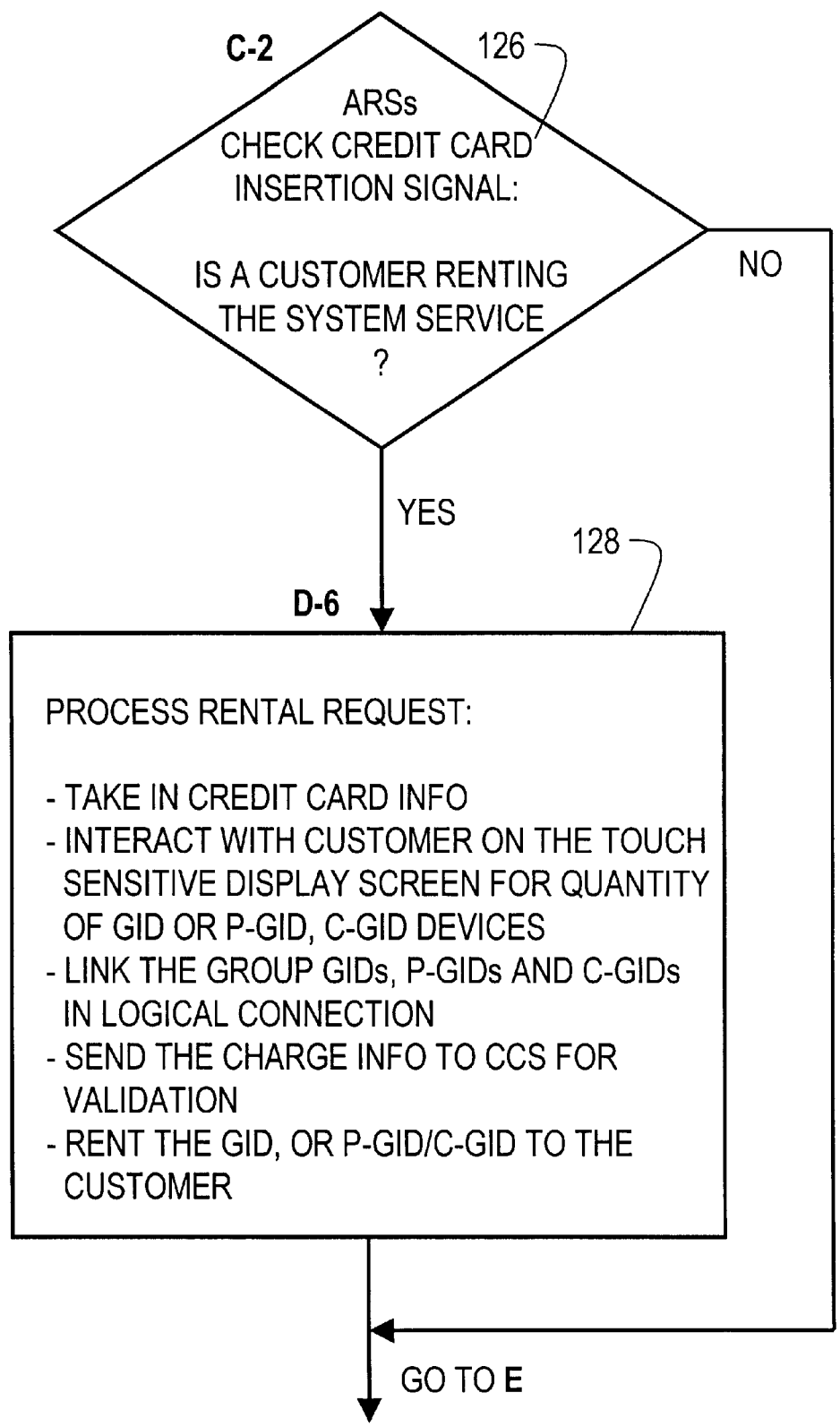
Figure 9:
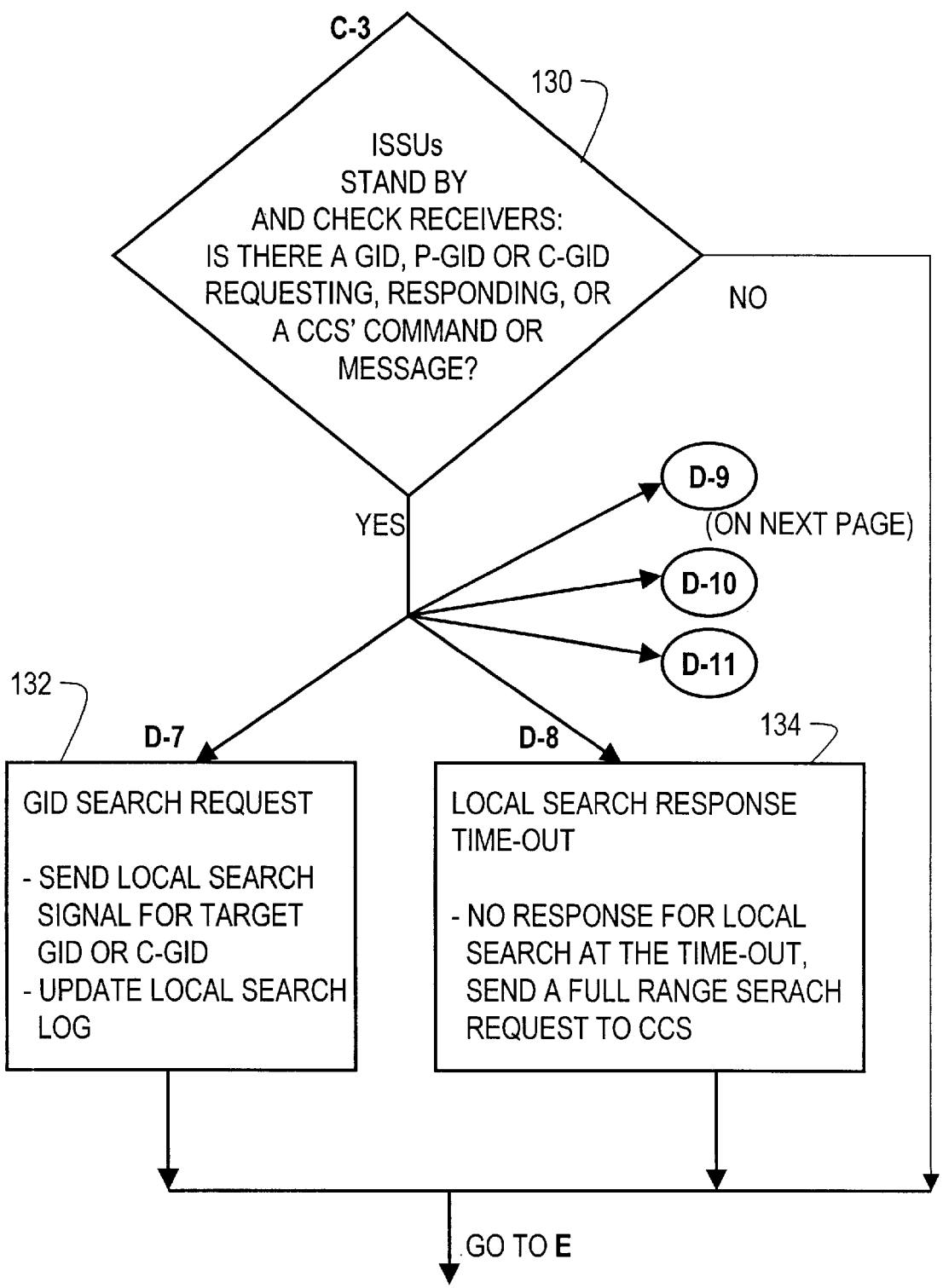
Figure 9:
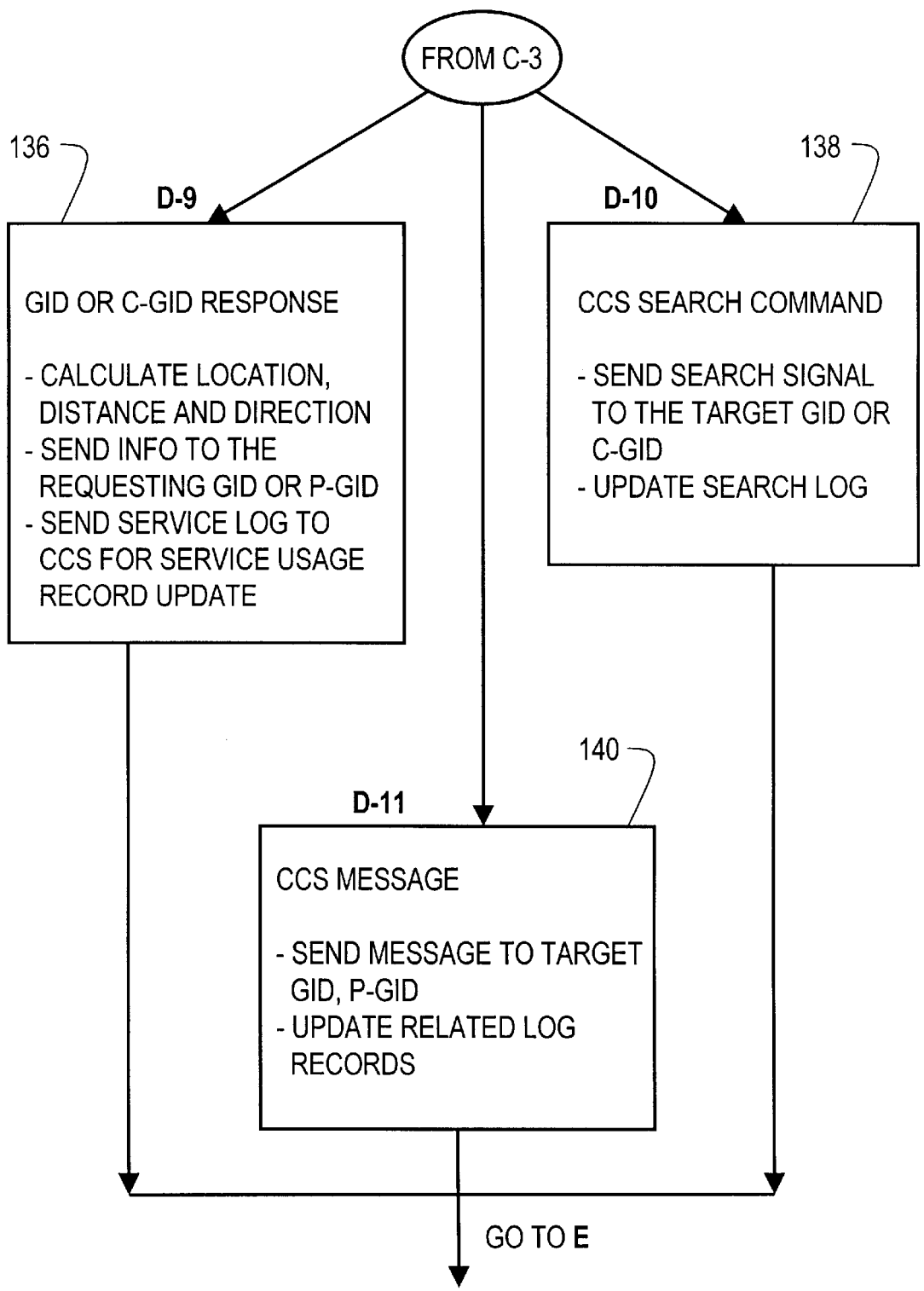

FIG. 7 depicts a flow chart diagram of the stand-by mode of the CCS 1 awaiting requests 116 through 124 of sub-systems 2 through 6. The similarity between these functions is that each is a request from one component of at least one sub-system to the CCS. No guest intervention or request need occur for these steps to happen. FIG. 8 depicts one user intervention 126 and 128, that of renting GID devices to park guests. FIG. 9 depicts a subroutine to which each ISSU 3 cycles through. Depending upon which instruction 130 is registered with an ISSU 3, any one of steps 132 through 140 are performed.

Figure 10:
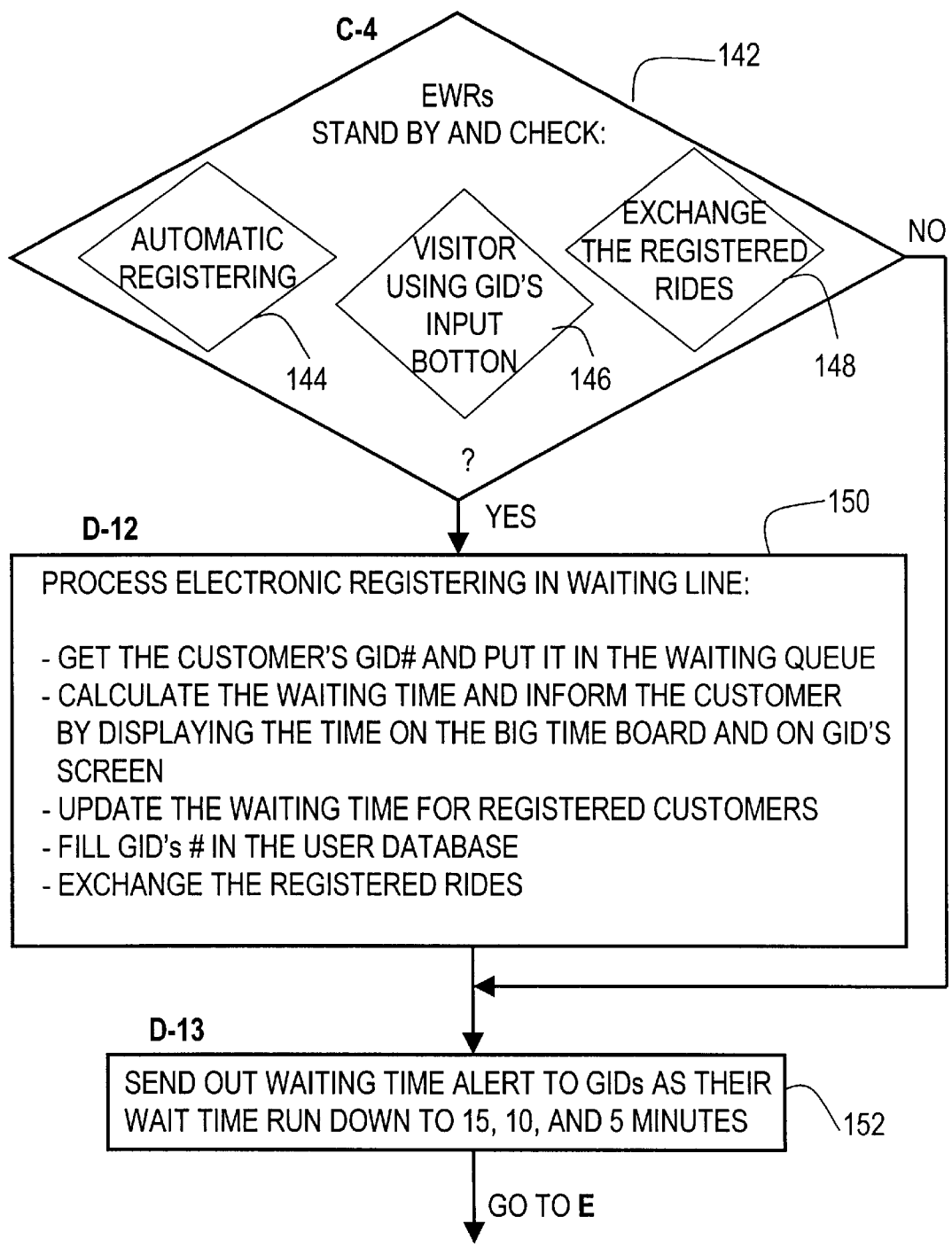

As depicted in FIG. 10, each EWR 4 awaits input 142 from any of three different sources; registration 144 by the GID device detector 20, programmed registration 146 via the GID device, and request for exchanging registration 148 with another. Upon the occurrence of any of these actions, the EWR processes the request 150. A subroutine 152 reviews the time remaining for each registered GID device and signals to the GID device when specific time increments remain.

Figure 11:
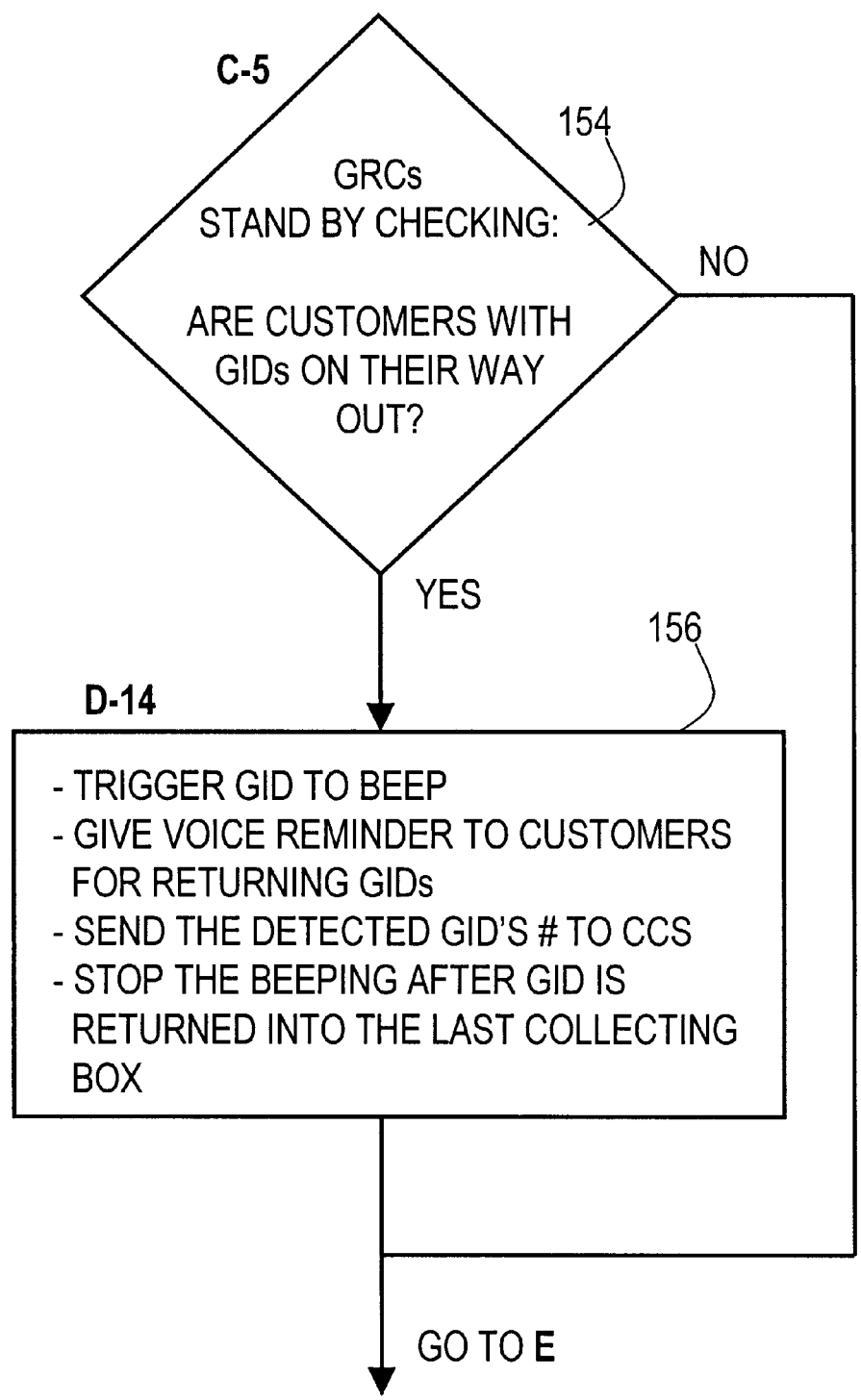
Figure 12:
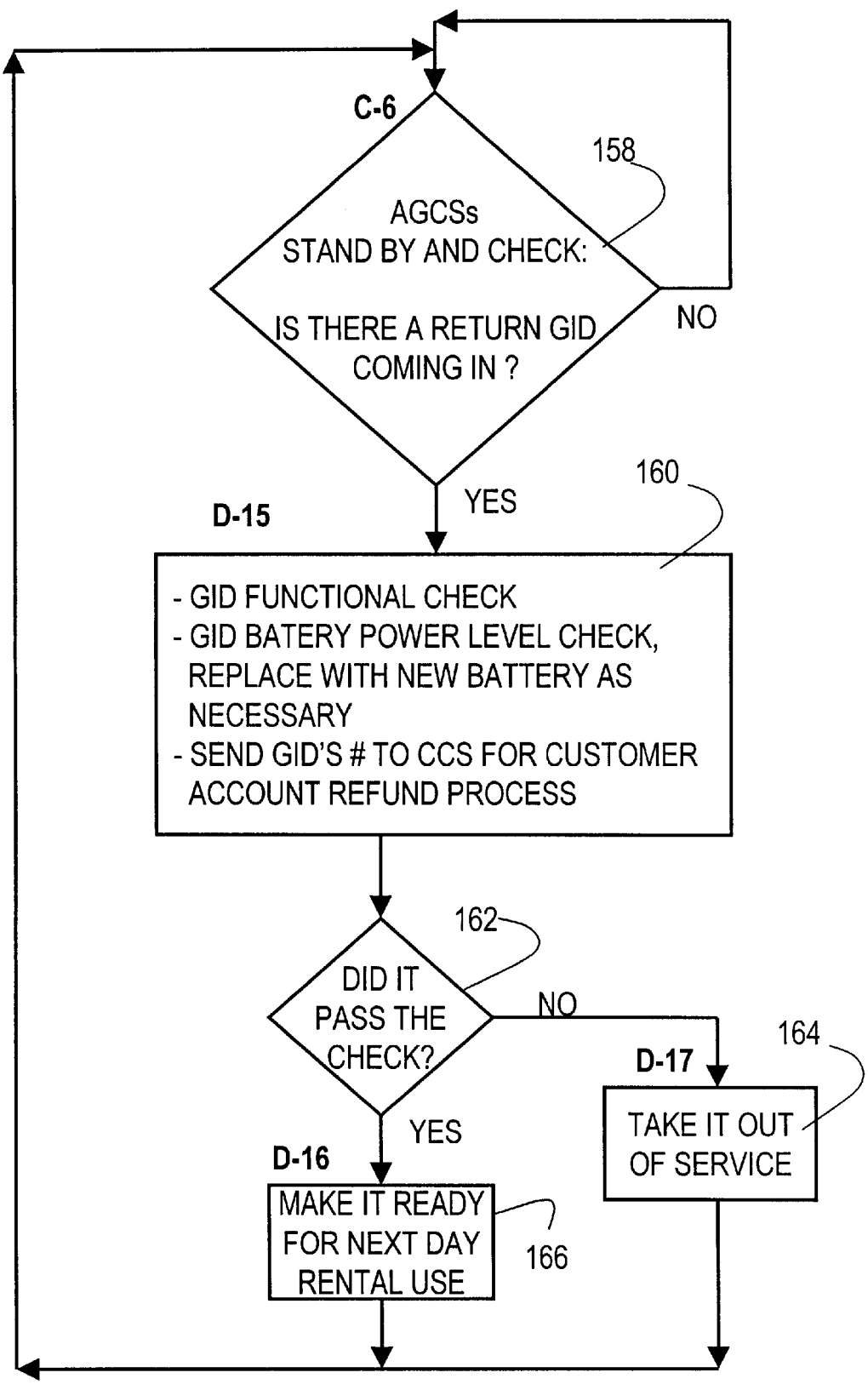
Figure 13:
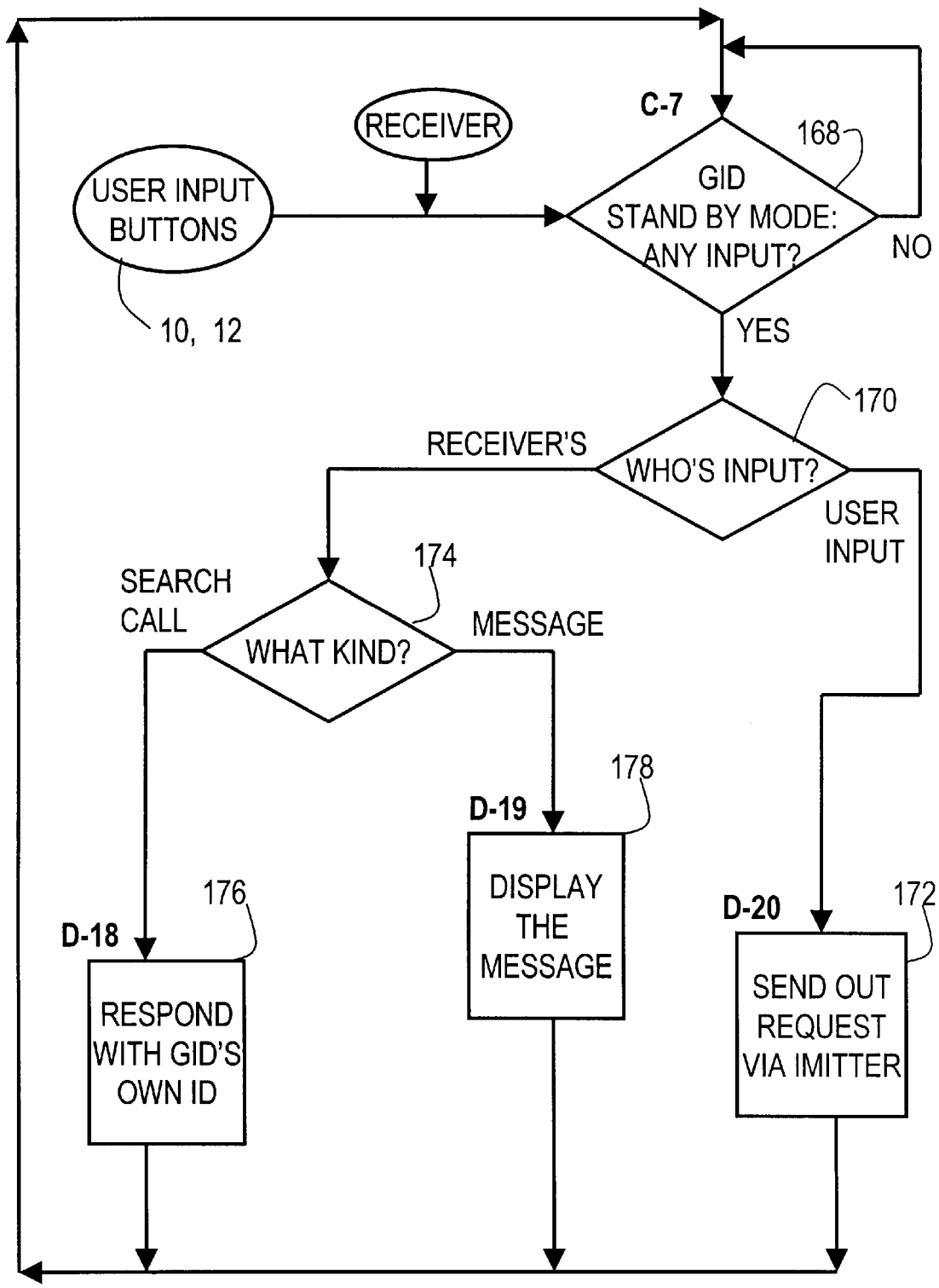

FIG. 11 shows the subroutine 154 of the GRC 5. Upon approach of a GID device to an exit, acknowledgment by the GID device 7 or 7a of the signal transmitted by the GRC 5, subroutine 156 occurs. Once the GID device is properly returned, as depicted on FIG. 12, the AGCS subroutine 158 initiates steps 160 through 166 to occur, testing the GID device, replacing the battery if necessary, and readying or disposing of the GID device as necessary. Operation of the GID device is depicted in FIG. 13. Each GID device is maintained in standby mode 168 awaiting a signal directly from a guest or transmitted to the GID device via wireless signal. An algorithm 170 determines which type of signal was received causing either subroutine 172 or 174 through 178 to occur. Furthermore, it would be a simple matter to program a function whereby utilizing the GID device subjects the user to a small charge. Since the guest's credit card number is logically attached to the GID device, charges can be debited accordingly from the guest's credit card.

Figure 14:
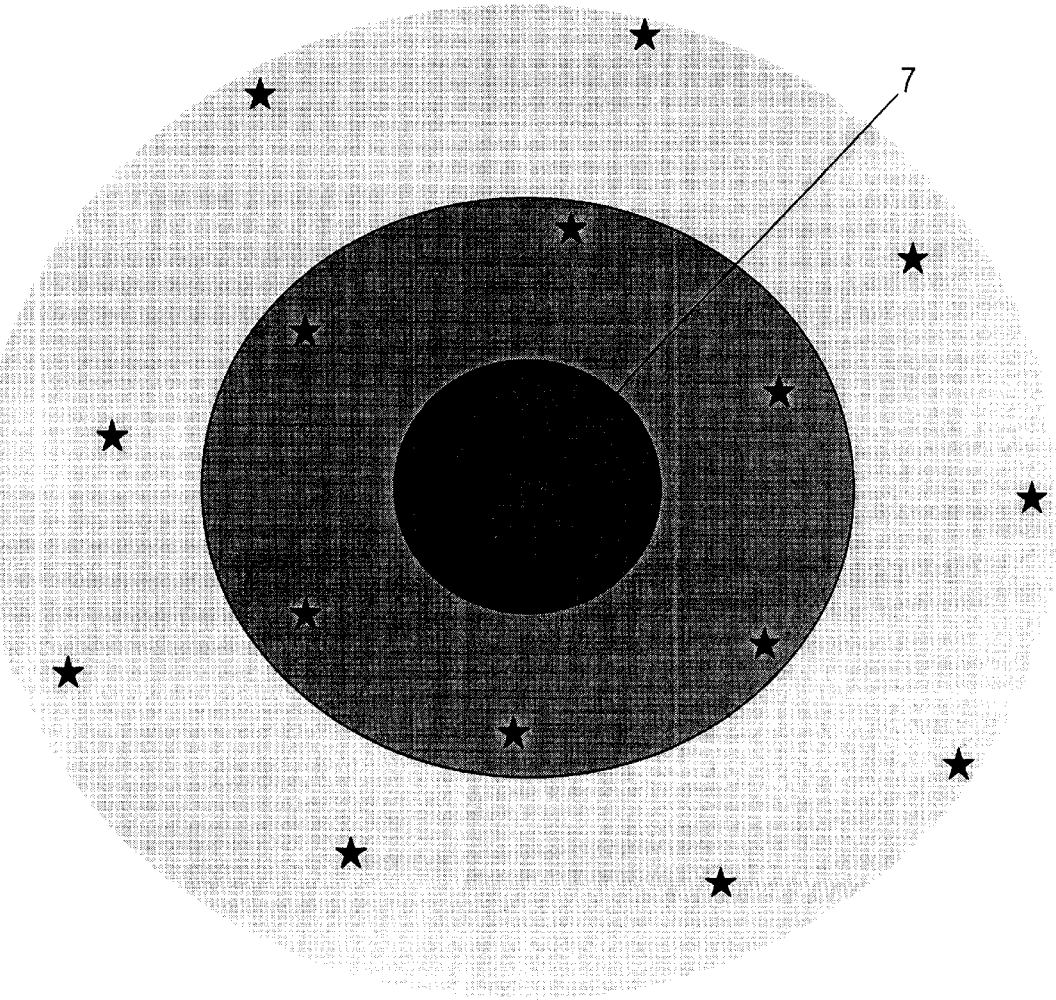
FIG. 14 is a perspective diagram of various power levels utilized with the FIG. 2 GID device.

FIG. 14 depicts an additional parameter which would be desirably incorporated into the invention, that of multiple power levels or signal strengths. The chart depicts three power levels which enable the GID device's signal to be sent out to different ranges. A basic transmission level is strong enough to allow the signal to reach the nearest ISSU. A mid-level transmission level allows the signal to be sent in a wider area. A high transmission level allows the GID device to transmit a signal over the entire park area. It is envisioned that each GID device will default to the lowest signal strength required for it to reach its destination.

The methods of making and using the device detailed above constitute the inventor's preferred embodiments and some alternate arrangements of the invention. The inventor is aware that numerous configurations are available which would provide the desired results. While the invention has been described and illustrated with reference to specific embodiments, it is understood that other embodiments may be resorted to without departing from the invention. Therefore the form of the invention set out above should be considered illustrative and not as limiting the scope of the following claims.

What is claimed is:

1. A method for electronically registering and holding a person's position in a queue comprising:

providing at least one main computer having at least one central processing unit with data storage and retrieval components;

providing a plurality of handheld transceivers each possessing a unique identification code, and each further having a visual display screen, an audio output device, a power source, and a plurality of user selectable input mechanisms wherein at least some of said transceivers are distributed to individual persons;

providing a plurality of registration computers each having at least one central processing unit, data storage and retrieval components, means for detecting, receiving, and transmitting wireless transmissions, and wherein each of said plurality of registration computers communicate with said main computer and with any number of said plurality of handheld transceivers;

associating one of said plurality of registration computers with a particular attraction; selecting any one of said particular attractions by manipulating the appropriate user selectable input mechanism on said transceiver;

transmitting a wireless signal from said transceiver to the registration computer associated with said particular attraction;

analyzing data contained within the data storage component of the registration computer to determine the next available time block associated with said attraction which correlates to the period of time remaining until the person is scheduled for the attraction;

calculating the period of time remaining until said time block;

registering said transceiver for said time block by adding the unique identification code associated with said transceiver to said data storage component of the registration computer;

transmitting a wireless signal from said registration computer to the transceiver confirming registration and notifying the person of the period of time remaining until said time block; and allowing said person access to said attraction when said period of time remaining is less than a predesignated period of time.

2. A method according to claim 1 comprising the additional steps of:

monitoring all transceivers registered to each of said registration computers and continuously updating said period of time remaining for each of said transceivers; and transmitting a wireless signal from said registration computer to each of said registered transceivers at preselected time intervals to update the person as to the then current period of time remaining until said time block.

3. A method according to claim 1 comprising the additional step of transmitting to said main computer from said registration computer information containing at least said unique identification code associated with said transceiver.

4. A method according to claim 1 comprising the additional step of providing each of said attractions with at least one user accessible station for enabling said person's transceiver to be recognized by said registration computer.

5. A method according to claim 4 wherein said at least one user accessible station comprises at least one user pass through mechanism, wherein said person who's time is less than said predesignated period of time is permitted to pass through said user pass through mechanism.

6. A method according to claim 5 wherein said user pass through mechanism reads said unique identification code associated with said transceiver and communicates said unique identification code to said registration computer to permit only those transceivers who's time is less than said predesignated period of time the ability to pass through.

7. A method according to claim 5 wherein said at least one user accessible station further comprises at least one user registration mechanism, through which said person passes whereupon said unique identification code is scanned and transmitted to said registration computer thereby registering said transceiver for said time block.

8. A method according to claim 1 further comprising the additional steps of: enabling persons to exchange time slots for which they are registered by manipulating the appropriate user selectable input mechanism on that person's transceiver;

transmitting that person's desire to exchange registrations;

searching said data storage for compatible exchanges;

swapping said unique identification codes associated with said time slot for compatible exchanges thereby exchanging registrations between said persons; and transmitting confirmation of exchange between said persons.

9. A method according to claim 1 further comprising the additional step of providing at least one automated transceiver distribution mechanism.

10. A method according to claim 9 wherein said automated transceiver distribution mechanism can selectively distribute an appropriate number of said transceivers selectable by the person for distribution to associated parties of said person by appropriately debiting an account maintained by said person, and further transmitting information pertaining to said distribution to said main computer.

11. A method according to claim 1 further comprising the additional step of automatically reregistering said person at least once with said attraction if said person fails to keep said time slot.

12. A method according to claim 1 further comprising the additional steps of:

enabling a first person to locate a second person by the first person manipulating the appropriate user selectable input mechanism on that person's transceiver;

transmitting a signal to said second person's transceiver;

alerting said second person by means of said audio output that said first person is searching for said second person;

transmitting said second person's location to said first person; and limiting said searching ability between persons who are members of predesignated groups.

13. A method according to claim 1 further comprising the additional step of providing at least one automated transceiver return mechanism.

14. A method according to claim 13 wherein said automated transceiver return mechanism is in communication with said main computer and notifies said main computer of the return of each specific transceiver thereby authorizing said main computer to appropriately credit each person's account where applicable.

15. A method according to claim 13 further comprising the additional step of providing at least one automated transceiver testing mechanism for testing returned transceivers, replacing transceiver power sources, and disposing of said transceiver, whichever is appropriate.

16. A method according to claim 1 further wherein selecting any one of said particular attractions further comprises the additional steps of:

depressing one of said user selectable input mechanisms;

scrolling through each registrable attraction displayed upon said visual display screen; and selecting the appropriate attraction by depressing another of said user selectable input mechanisms.

17. A computerized system adapted for use in theme or amusement parks for electronically registering and holding a position in a queue and for locating individual members of distinct groups comprising:

a plurality of handheld transceivers, each programmed with a unique identification code, and each having a visual display screen, an audio output device, a power source, a plurality of user selectable input mechanisms, and each capable of detecting, receiving, and transmitting wireless transmissions;

a plurality of electronic registration mechanisms, each associated with one particular attraction, and each capable of detecting, receiving, and transmitting wireless transmissions;

a plurality of identification code searching mechanisms located at various points throughout said park, each capable of detecting, receiving, and transmitting wireless transmissions; and at least one main computer adapted to communicate with any of said electronic registration mechanisms and any of said identification code searching mechanisms, said main computer having at least a memory component to store for subsequent manipulation and retrieval information associated with and provided to said system;

wherein each of said plurality of electronic registration mechanisms further comprise a computer with means for both electronically storing in a particular order and retrieving said unique identification codes within a memory component and further associating each of said identification codes with a time slot correlated to a specific appointment with the attraction to which said electronic registration mechanism is associated, and at least one user accessible site to enable a person access to said attraction upon the occurrence of specific conditions;

wherein each of said plurality of electronic registration mechanisms transmit a signal recognizable to all transceivers, said signal causing one of said transceivers located within some predetermined range from said electronic registration mechanism to transmit its unique identification code to an appropriate receiving mechanism associated with said electronic registration mechanism causing said transceiver to register, access, or otherwise interact with said electronic registration mechanism;

wherein each of said plurality of identification code searching mechanisms receive transmissions from any of said transceivers, said electronic registration mechanisms, any other identification code searching mechanism, and the main computer and wherein said identification code searching mechanism further relays said transmission as required to any of another transceiver, an electronic registration mechanism, another identification code searching mechanism, and the main computer, whichever is appropriate;

wherein said main computer forms a central link between said plurality of electronic registration mechanisms and said plurality of identification code searching mechanisms;

and wherein further said unique identification codes are electronically associated as appropriate only between members of said discrete groups; and wherein said main computer maintains and controls functionability of the system.

18. A computerized system in accordance with claim 17 further comprising at least one automated transceiver distribution mechanism.

19. A computerized system in accordance with claim 18 wherein said automated transceiver distribution mechanism further comprises:

a credit/debit card reading means for reading information contained upon a credit card;

a user selectable input means for selecting an appropriate quantity of transceivers correlated to the number of people in the person's group to be debited to said credit/debit card;

a display means responsive to said input means for providing visual information to said person;

at least one transceiver distribution mechanism for providing the appropriate number of transceivers to the person;

storage means for storing a quantity of said transceivers which have not yet been distributed; and means for communicating with the main computer to relay at least the credit/debit transaction information as well as the transmission of each distributed transceiver's identification codes so that said codes can be linked to the discrete group.

20. A computerized system in accordance with claim 18 further comprising at least one automated transceiver return mechanism.

21. A computerized system in accordance with claim 20 wherein said automated transceiver return mechanism further comprises:

a short range, narrow directional transceiving mechanism which communicates via wireless signal with said transceiver should said transceiver enter a predesignated area thereby causing said transceiver to emit at least one format of audible sound;

at least one audio output device which emits at least one audible sound for the purpose of alerting and instructing persons regarding their retention of one of said transceivers;

a transceiver repository within which said transceivers are returned, said repository serves to silence the audible sounds of each of said transceiver and said transceiver return mechanism by deactivating said wireless signal; and a means for communicating with said main computer that said transceiver has been returned and an appropriate credit should be restored to said credit/debit card if applicable.

22. A computerized system in accordance with claim 20 further comprising at least one automated transceiver testing mechanism for testing returned transceivers, replacing transceiver power sources, and disposing of said transceivers, whichever is appropriate.

23. A computerized system in accordance with claim 17 further comprising at least one automated transceiver return mechanism.

24. A computerized system in accordance with claim 23 wherein said automated transceiver return mechanism further comprises:

a short range, narrow directional transceiving mechanism which communicates via wireless signal with said transceiver should said transceiver enter a predesignated area thereby causing said transceiver to emit at least one format of audible sound;

at least one audio output device which emits at least one audible sound for the purpose of alerting and instructing persons regarding their retention of one of said transceivers;

a transceiver repository within which said transceivers are returned, said repository serves to silence the audible sounds of each of said transceiver and said transceiver return mechanism by deactivating said wireless signal; and a means for communicating with said main computer that said transceiver has been returned and an appropriate credit should be restored to said credit/debit card if applicable.

25. A computerized system in accordance with claim 23 further comprising at least one automated transceiver testing mechanism for testing returned transceivers, replacing transceiver power sources, and disposing of said transceivers, whichever is appropriate.

26. A computerized system in accordance with claim 17 wherein at least one user accessible site associated with any of said electronic registration mechanisms further comprises at least one user pass through mechanism, wherein each person having some predesignated period of time remaining until the onset of said time slot is permitted to pass through said user pass through mechanism to access the attraction.

27. A computerized system in accordance with claim 26 wherein said user pass through mechanism reads said unique identification code associated with said transceiver and communicates said unique identification code to said electronic registration mechanisms to permit only those transceivers who's time is less than said predesignated period of time the ability to pass through.

28. A computerized system in accordance with claim 26 wherein at least one user accessible site associated with any of said electronic registration mechanisms further comprises at least one user registration mechanism, through which said person passes whereupon said unique identification code is scanned and transmitted to said electronic registration mechanism thereby registering said transceiver for said time block.

29. A computerized system in accordance with claim 17 wherein at least one user accessible site associated with any of said electronic registration mechanisms further comprises at least one user registration mechanism, through which said person passes whereupon said unique identification code is scanned and transmitted to said electronic registration mechanism thereby registering said transceiver for said time block.

30. A computerized system in accordance with claim 17 wherein said electronic registration mechanism automatically reregisters every transceiver at least once with said attraction if the person associated with said transceiver fails to keep said time slot.

31. A computerized system in accordance with claim 17 wherein said plurality of user selectable input mechanisms associated with each transceiver further comprise:
    scrolling means for scrolling through each registrable attraction;
    scrolling means for scrolling through a selection corresponding to each individual member of said person's group;
    selection means for specifying a desired selection; and
    an audio output silencing means.

32. A computerized system in accordance with claim 31 wherein said scrolling means and said selection means comprise push buttons.

33. A computerized system in accordance with claim 17 further comprising an adult transceiver and a child transceiver, wherein said child transceiver selectable input mechanisms comprise a speaker activated when an adult transceiver from the same group attempts to locate said child transceiver.

34. A computerized system in accordance with claim 17 wherein said transceivers further comprise two power levels, a first power level for near searches and a second power level for farther searches.

35. A computerized system for electronically registering and holding a position in a queue comprising:
    a plurality of handheld transceivers, each programmed with a unique identification code, and each having a visual display screen, an audio output device, a power source, a plurality of user selectable input mechanisms, and each capable of detecting, receiving, and transmitting wireless transmissions;
    a plurality of electronic registration mechanisms, each associated with a particular attraction, and each capable of detecting, receiving, and transmitting wireless transmissions; and
    at least one main computer adapted to communicate with any of said electronic registration mechanisms, said main computer having at least a memory component to store for subsequent manipulation and retrieval information associated with and provided to said system;
    wherein each of said plurality of electronic registration mechanisms further comprise a computer with means for both electronically storing in a particular order and retrieving said unique identification codes within a memory component and further associating each of said identification codes with a time slot correlated to a specific appointment with the attraction to which said electronic registration mechanism is associated, and at least one user accessible site to enable a person access to said attraction upon the occurrence of specific conditions; and
    wherein each of said plurality of electronic registration mechanisms transmit a signal recognizable to all transceivers, said signal causing one of said transceivers located within some predetermined range from said electronic registration mechanism to transmit its unique identification code to an appropriate receiving mechanism associated with said electronic registration mechanism causing said transceiver to register, access, or otherwise interact with said electronic registration mechanism.

36. A computerized system in accordance with claim 35 further comprising means for distributing said transceivers.

37. A computerized system in accordance with claim 36 wherein said means for distributing said transceivers further comprises:
    a credit/debit card reading means for reading information contained upon a credit card;
    a user selectable input means for selecting an appropriate quantity of transceivers as requested by said person;
    a display means responsive to said input means for providing visual information to said person;
    at least one transceiver distribution mechanism for providing the appropriate number of transceivers to the person; and
    means for communicating with the main computer to relay at least the credit/debit transaction information.

38. A computerized system in accordance with claim 35 further comprising means for collecting said transceivers.

39. A computerized system in accordance with claim 38 wherein said means for collecting said transceivers further comprises:
    a short range, narrow directional transceiving mechanism which communicates via wireless signal with said transceiver should said transceiver enter a predesignated area thereby causing said transceiver to emit at least one format of audible sound;
    at least one audio output device which emits at least one audible sound for the purpose of alerting and instructing persons regarding their retention of one of said transceivers;
    a transceiver repository within which said transceivers are returned, said repository serves to silence the audible sounds of each of said transceiver and said transceiver return mechanism by deactivating said wireless signal; and a means for communicating with said main computer that said transceiver has been returned.

40. A computerized system in accordance with claim 35 further comprising at least one mechanism for testing, repairing, and disposing of returned transceivers.

41. A computerized system in accordance with claim 40 wherein said mechanism performing said testing, repairing, and disposing of returned transceivers further comprises a transceiver functional test to determine if it is capable of transmitting and receiving the appropriate wireless signal, and a power supply test, wherein failure of said power supply test results in replacement of said power supply, and failure of said functional test results in withdrawal of the transceiver from said system.

42. A computerized system in accordance with claim 35 wherein at least one user accessible site associated with any of said electronic registration mechanisms further comprises at least one user pass through mechanism, wherein each person having some predesignated period of time remaining until the onset of said time slot is permitted to pass through said user pass through mechanism to access the attraction.

43. A computerized system in accordance with claim 42 wherein said user pass through mechanism reads said unique identification code associated with said transceiver and communicates said unique identification code to said electronic registration mechanisms to permit only those transceivers who's time is less than said predesignated period of time the ability to pass through.

44. A computerized system in accordance with claim 42 wherein there are two user accessible sites associated with any of said electronic registration mechanisms and wherein said second user accessible site further comprises at least one user registration mechanism, through which said person passes whereupon said unique identification code is scanned and transmitted to said electronic registration mechanism thereby registering said transceiver for said time block.

45. A computerized system in accordance with claim 35 wherein at least one user accessible site associated with any of said electronic registration mechanisms further comprises at least one user registration mechanism, through which said person passes whereupon said unique identification code is scanned and transmitted to said electronic registration mechanism thereby registering said transceiver for said time block.

46. A computerized system in accordance with claim 35 wherein said electronic registration mechanism automatically reregisters every transceiver at least once with said attraction if the person associated with said transceiver fails to keep said time slot.

47. A computerized system in accordance with claim 35 wherein said plurality of user selectable input mechanisms associated with each transceiver further comprise:

scrolling means for scrolling through each registrable attraction; and selection means for specifying a desired selection.

* * * * *